US010923097B2

(12) United States Patent
Parikh et al.

(10) Patent No.: US 10,923,097 B2
(45) Date of Patent: Feb. 16, 2021

(54) PINNA PROXIMITY DETECTION

(71) Applicant: Cirrus Logic International Semiconductor Ltd., Edinburgh (GB)

(72) Inventors: Viral Parikh, Austin, TX (US); Jon D. Hendrix, Wimberley, TX (US); Jeffrey D. Alderson, Austin, TX (US); Vitaliy Sapozhnykov, Victoria (AU); Nafiseh Erfanian Saeedi, Victoria (AU); Thomas I. Harvey, Victoria (AU); Robert Luke, Victoria (AU)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 16/539,092

(22) Filed: Aug. 13, 2019

(65) Prior Publication Data

US 2020/0058285 A1 Feb. 20, 2020

Related U.S. Application Data

(60) Provisional application No. 62/719,767, filed on Aug. 20, 2018.

(51) Int. Cl.
*G10K 11/178* (2006.01)
*H04M 1/02* (2006.01)

(52) U.S. Cl.
CPC .. *G10K 11/17823* (2018.01); *G10K 11/17853* (2018.01); *G10K 2210/108* (2013.01); *G10K 2210/3028* (2013.01); *G10K 2210/3044* (2013.01); *G10K 2210/3056* (2013.01); *H04M 1/0202* (2013.01)

(58) Field of Classification Search
CPC ....... G10K 11/17823; G10K 11/17853; G10K 2210/108; G10K 2210/3028; G10K 2210/3044; G10K 2210/3056; H04M 1/0202
See application file for complete search history.

(56) References Cited

U.S. PATENT DOCUMENTS

| 6,542,436 B1 | 4/2003 | Myllyla |
| 2005/0221792 A1 | 10/2005 | Mattisson |
| 2014/0364171 A1 | 12/2014 | Heiman et al. |
| 2015/0289070 A1 | 10/2015 | Armstrong-Muntner |

FOREIGN PATENT DOCUMENTS

WO  2012166272 A2  12/2012

OTHER PUBLICATIONS

International Search Report and Written Opinion of the International Searching Authority, International Application No. PCT/US2019/047060, dated Nov. 29, 2019.

*Primary Examiner* — Regina N Holder
(74) *Attorney, Agent, or Firm* — Jackson Walker L.L.P.

(57) ABSTRACT

An integrated circuit for implementing at least a portion of a personal audio device may include an output for providing an output signal to a transducer, wherein the output signal includes a pilot signal, a microphone input for receiving a microphone signal from a microphone indicative of an output of the transducer, and a processing circuit. The processing circuit may be configured to implement a pilot signal control to apply an adjustment to the pilot signal as necessary to maintain the pilot signal at a substantially constant magnitude regardless of proximity of the transducer to a pinna and implement a proximity determination block configured to determine proximity of the transducer to the pinna based on the adjustment.

42 Claims, 24 Drawing Sheets

PINNA PROXIMITY DETECTION

RELATED APPLICATION

The present disclosure claims priority to U.S. Provisional Patent Application Ser. No. 62/719,767, filed Aug. 20, 2018, which is incorporated by reference herein in its entirety.

FIELD OF DISCLOSURE

The present disclosure relates in general to adaptive noise cancellation in connection with an acoustic transducer, and more particularly, to resetting filter coefficients of an adaptive noise cancellation system in a manner that minimizes audible artifacts.

BACKGROUND

Wireless telephones, such as mobile/cellular telephones, cordless telephones, and other consumer audio devices, such as mp3 players, are in widespread use. Performance of such devices with respect to intelligibility may be improved by providing noise cancelling using a microphone to measure ambient acoustic events and then using signal processing to insert an anti-noise signal into the output of the device to cancel the ambient acoustic events.

An active noise cancellation (ANC) system achieves the suppression of noise by observing the ambient noise with one or more microphones and processing the noise signal with digital filters to generate an anti-noise signal, which is then played through a loudspeaker. The application of active noise cancellation to personal audio devices such as wireless telephones and headphones is intended to enhance the users' listening experience with respect to intelligibility and isolation from the ambient noise. Because the acoustic environment around personal audio devices may change depending on the noise sources that are present and the position or fitting condition of the device itself, an active noise cancellation system may be implemented with adaptive filters in order to adapt the anti-noise to take such environmental changes into account.

In many instances, it is beneficial to detect when a user removes a headset from the user's ear(s). A pinna proximity detector (PPD) may detect such an event. Pinna proximity detection may have many applications and uses. For example, an audio system may be configured to play back audio when a speaker is coupled to a pinna and pause audio playback when the speaker is not coupled to the pinna, to enhance user experience. As another example, an audio system may be configured to power off a headset when not coupled to a pinna in order to decrease power consumption and extend battery life.

Traditionally, pinna proximity detection has been performed by playing a single low-frequency tone (e.g., 20 Hz) and measuring the amplitude of this tone at a microphone that is located on the headset between the speaker and the user's pinna. However, this approach does not work well when low-frequency noise is present in loud ambient audio environment, nor does such approach work well when the playback audio is loud, nor does such approach work well in an adaptive ANC system. Furthermore, this traditional solution consumes significant power in order to transmit a low-frequency tone continuously.

Accordingly, an approach is desired to detect an off-ear situation reliably across all different acoustic scenarios, and to do this in an ANC headset which presents challenges to pinna proximity detection which a non-ANC headset does not.

SUMMARY

In accordance with the teachings of the present disclosure, certain disadvantages and problems associated with existing approaches to pinna proximity detection may be reduced or eliminated.

In accordance with embodiments of the present disclosure, an integrated circuit for implementing at least a portion of a personal audio device may include an output for providing an output signal to a transducer, wherein the output signal includes a pilot signal, a microphone input for receiving a microphone signal from a microphone indicative of an output of the transducer, and a processing circuit. The processing circuit may be configured to implement a pilot signal control to apply an adjustment to the pilot signal as necessary to maintain the pilot signal at a substantially constant magnitude regardless of proximity of the transducer to a pinna and implement a proximity determination block configured to determine proximity of the transducer to the pinna based on the adjustment.

In accordance with these and embodiments of the present disclosure, a method may include providing an output signal to a transducer, wherein the output signal includes a pilot signal, receiving a microphone signal from a microphone indicative of an output of the transducer, applying an adjustment to the pilot signal as necessary to maintain the pilot signal at a substantially constant magnitude regardless of proximity of the transducer to a pinna, determining proximity of the transducer to the pinna based on the adjustment.

Technical advantages of the present disclosure may be readily apparent to one of ordinary skill in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

The present disclosure encompasses noise cancelling techniques and circuits that may be implemented in a personal audio device, such as a wireless telephone. The personal audio device includes an ANC circuit that may measure the ambient acoustic environment and generate a signal that is injected into the speaker (or other transducer) output to cancel ambient acoustic events. A reference microphone may be provided to measure the ambient acoustic environment and an error microphone may be included for controlling the adaptation of the anti-noise signal to cancel the ambient audio sounds and for correcting for the electroacoustic path from the output of the processing circuit through the transducer.

Figure 1A:
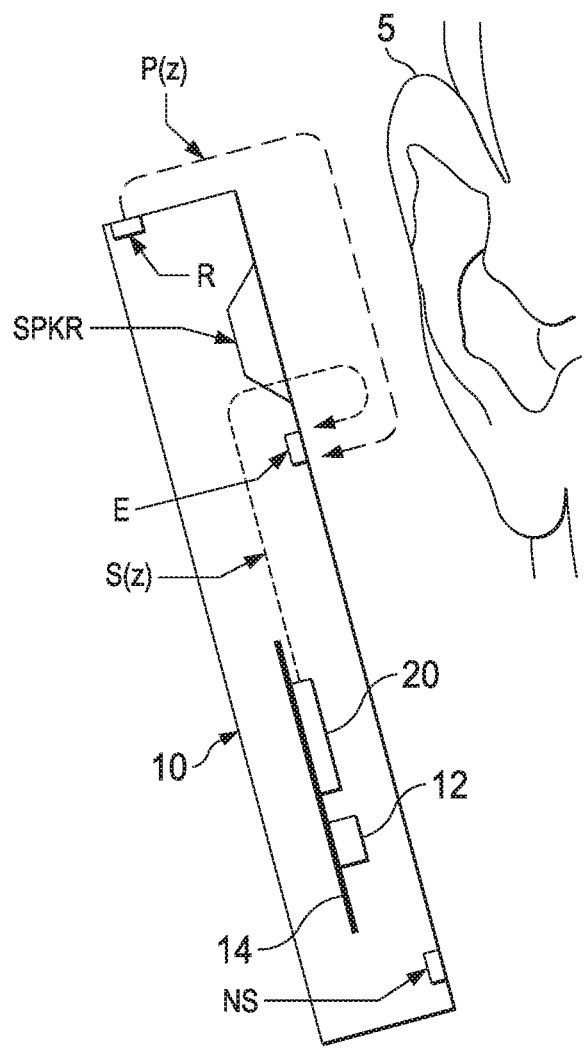
FIG. 1A is an illustration of an example wireless mobile telephone, in accordance with embodiments of the present disclosure.

Referring now to FIG. 1A, a personal audio device 10 as illustrated in accordance with embodiments of the present disclosure is shown in proximity to a human ear 5. Personal audio device 10 is an example of a device in which techniques in accordance with embodiments of this disclosure may be employed, but it is understood that not all of the elements or configurations embodied in illustrated personal audio device 10, or in the circuits depicted in subsequent illustrations, are required in order to practice the features recited in the claims. Personal audio device 10 may include a transducer such as speaker SPKR that reproduces distant speech received by personal audio device 10, along with other local audio events such as ringtones, stored audio program material, injection of near-end speech (i.e., the speech of the user of personal audio device 10) to provide a balanced conversational perception, and other audio that requires reproduction by personal audio device 10, such as sources from webpages or other network communications received by personal audio device 10 and audio indications such as a low battery indication and other system event notifications. A near-speech microphone NS may be provided to capture near-end speech, which is transmitted from personal audio device 10 to the other conversation participant(s).

Personal audio device 10 may include ANC circuits and features that inject an anti-noise signal into speaker SPKR to improve intelligibility of the distant speech and other audio reproduced by speaker SPKR. A reference microphone R may be provided for measuring the ambient acoustic environment, and may be positioned away from the typical position of a user's mouth, so that the near-end speech may be minimized in the signal produced by reference microphone R. Another microphone, error microphone E, may be provided in order to further improve the ANC operation by providing a measure of the ambient audio combined with the audio reproduced by speaker SPKR close to ear 5, when personal audio device 10 is in close proximity to ear 5. In some embodiments, additional reference and/or error microphones may be employed. In yet other embodiments, an ANC system may include error microphone E, but no reference microphone R.

Circuit 14 within personal audio device 10 may include an audio CODEC integrated circuit (IC) 20 that receives the signals from reference microphone R, near-speech microphone NS, and error microphone E and interfaces with other integrated circuits such as a radio-frequency (RF) integrated circuit 12 having a wireless telephone transceiver. In some embodiments of the disclosure, the circuits and techniques disclosed herein may be incorporated in a single integrated circuit that includes control circuits and other functionality for implementing the entirety of the personal audio device, such as an MP3 player-on-a-chip integrated circuit. In these and other embodiments, the circuits and techniques disclosed herein may be implemented partially or fully in software and/or firmware embodied in computer-readable media and executable by a controller or other processing device.

In general, ANC techniques of the present disclosure may measure ambient acoustic events (as opposed to the output of speaker SPKR and/or the near-end speech) impinging on reference microphone R (in embodiments in which reference microphone R is present), and by also measuring the same ambient acoustic events impinging on error microphone E, ANC processing circuits of personal audio device 10 adapt an anti-noise signal generated from the output of reference microphone R to have a characteristic that minimizes the amplitude of the ambient acoustic events at error microphone E. Because acoustic path P(z) extends from reference microphone R to error microphone E, ANC circuits may effectively estimate acoustic path P(z) while removing effects of an electro-acoustic path S(z) that represents the response of the audio output circuits of CODEC IC 20 and the acoustic/electric transfer function of speaker SPKR including the coupling between speaker SPKR and error microphone E in the particular acoustic environment, which may be affected by the proximity and structure of ear 5 and other physical objects and human head structures that may be in proximity to personal audio device 10, when personal audio device 10 is not firmly pressed to ear 5. While the illustrated personal audio device 10 includes a two-microphone ANC system with a third near-speech microphone NS, some aspects of the present disclosure may be practiced in a system that does not include separate error and reference microphones, or a wireless telephone that uses near-speech microphone NS to perform the function of the reference microphone R. Also, in personal audio devices designed only for audio playback, near-speech microphone NS will generally not be included, and the near-speech signal paths in the circuits described in further detail below may be omitted, without changing the scope of the disclosure, other than to limit the options provided for input to the microphone.

Figure 1B:
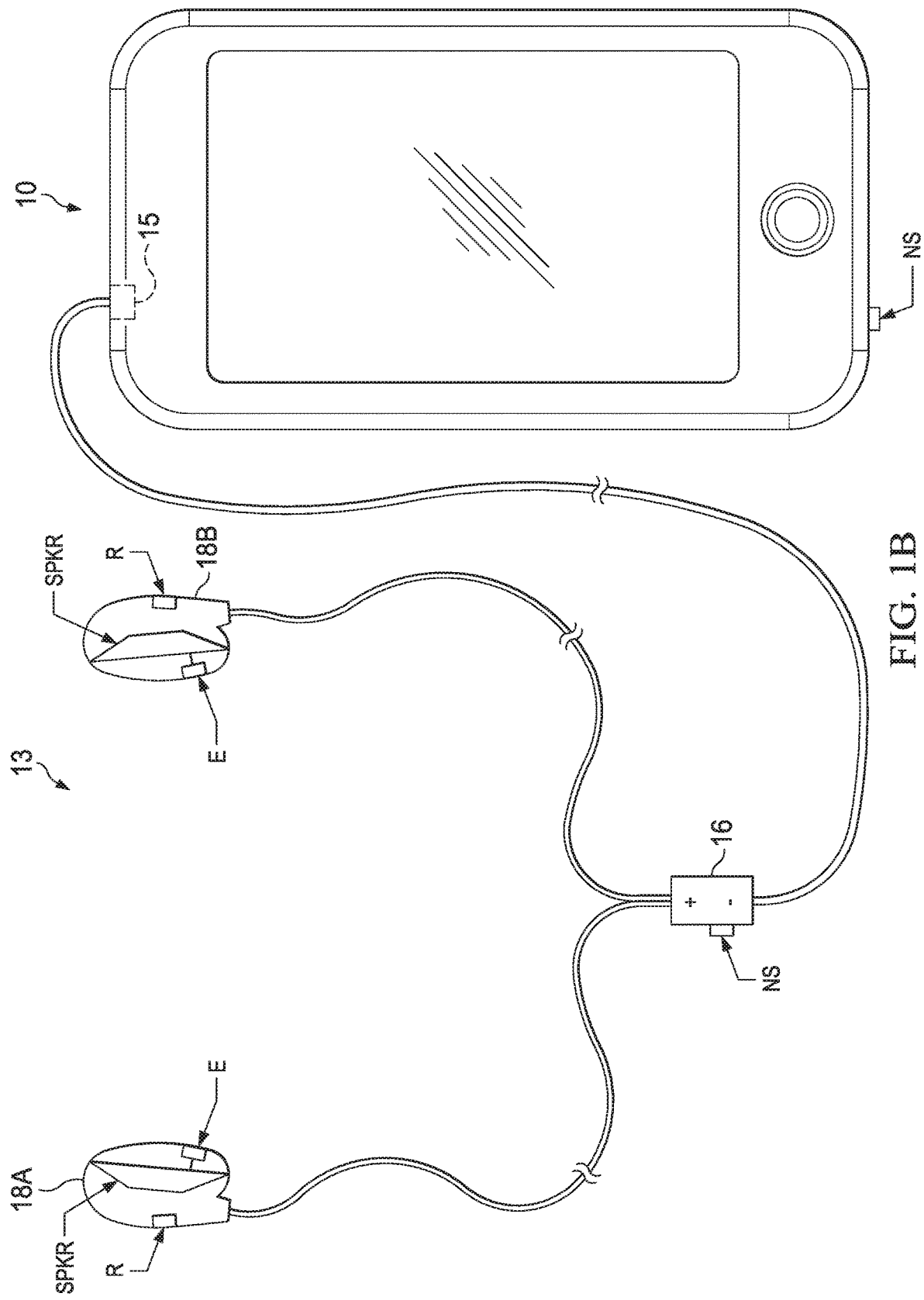
FIG. 1B is an illustration of an example wireless mobile telephone with a headphone assembly coupled thereto, in accordance with embodiments of the present disclosure.

Referring now to FIG. 1B, personal audio device 10 is depicted having a headphone assembly 13 coupled to it via audio port 15. Audio port 15 may be communicatively coupled to RF integrated circuit 12 and/or CODEC IC 20, thus permitting communication between components of headphone assembly 13 and one or more of RF integrated circuit 12 and/or CODEC IC 20. As shown in FIG. 1B, headphone assembly 13 may include a combox 16, a left headphone 18A, and a right headphone 18B. In some embodiments, headphone assembly 13 may comprise a wireless headphone assembly, in which case all or some portions of CODEC IC 20 may be present in headphone assembly 13, and headphone assembly 13 may include a wireless communication interface (e.g., BLUETOOTH) in order to communicate between headphone assembly 13 and personal audio device 10.

As used in this disclosure, the term "headphone" broadly includes any loudspeaker and structure associated therewith that is intended to be mechanically held in place proximate to a listener's ear canal, and includes without limitation earphones, earbuds, and other similar devices. As more specific examples, "headphone" may refer to intra-concha earphones, supra-concha earphones, and supra-aural earphones.

Combox 16 or another portion of headphone assembly 13 may have a near-speech microphone NS to capture near-end speech in addition to or in lieu of near-speech microphone NS of personal audio device 10. In addition, each headphone 18A, 18B may include a transducer such as speaker SPKR that reproduces distant speech received by personal audio device 10, along with other local audio events such as ringtones, stored audio program material, injection of near-end speech (i.e., the speech of the user of personal audio device 10) to provide a balanced conversational perception, and other audio that requires reproduction by personal audio device 10, such as sources from webpages or other network communications received by personal audio device 10 and audio indications such as a low battery indication and other system event notifications. Each headphone 18A, 18B may include a reference microphone R for measuring the ambient acoustic environment and an error microphone E for measuring of the ambient audio combined with the audio reproduced by speaker SPKR close to a listener's ear when such headphone 18A, 18B is engaged with the listener's ear. In some embodiments, CODEC IC 20 may receive the signals from reference microphone R and error microphone E of each headphone and near-speech microphone NS, and perform adaptive noise cancellation for each headphone as described herein. In other embodiments, a CODEC IC or another circuit may be present within headphone assembly 13, communicatively coupled to reference microphone R, near-speech microphone NS, and error microphone E, and configured to perform adaptive noise cancellation as described herein. As in FIG. 1A, in some embodiments the configuration shown in FIG. 1B may include error microphones E, but no reference microphones R.

Figure 2:
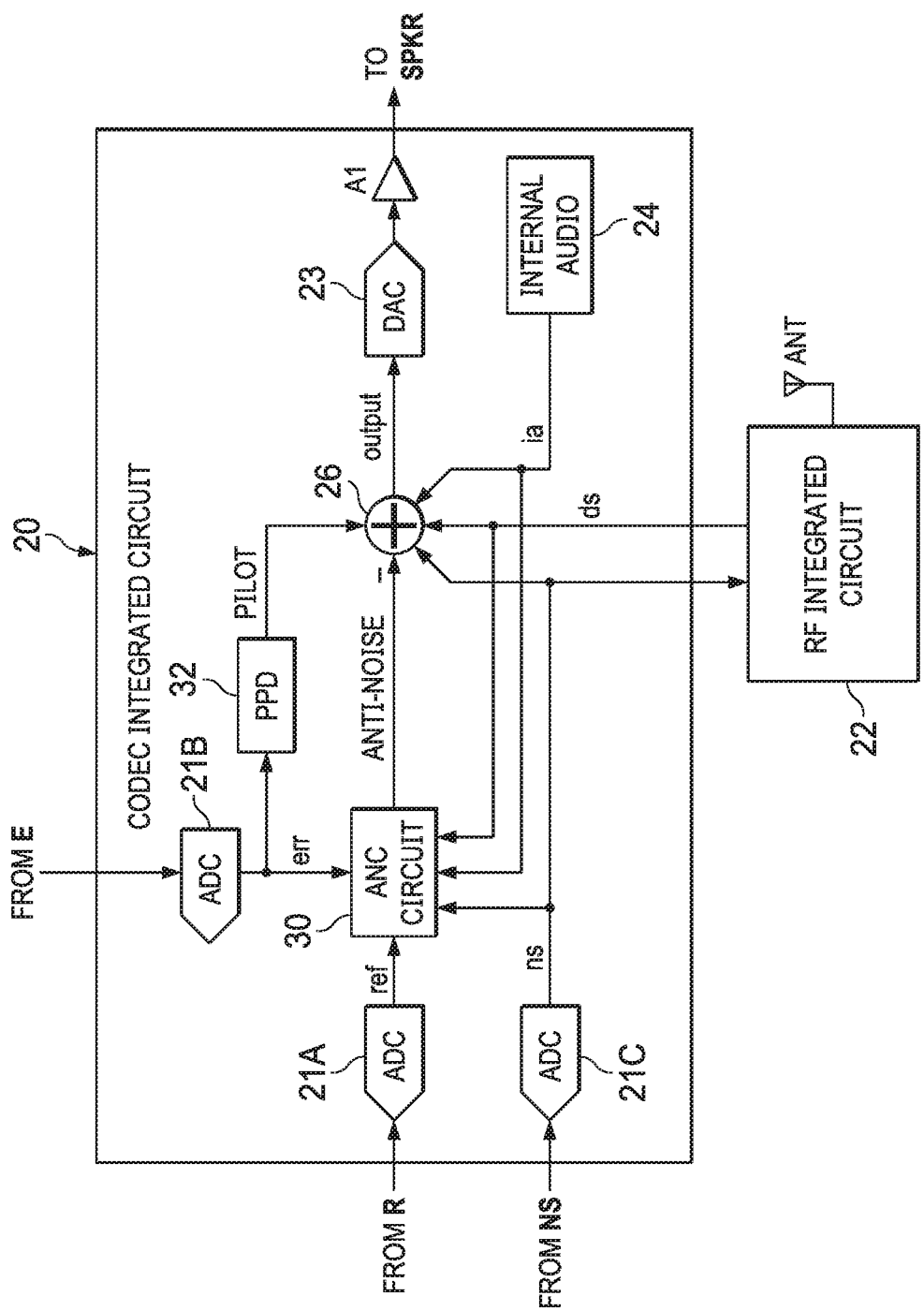
FIG. 2 is a block diagram of selected circuits within the wireless mobile telephone depicted in FIG. 1A, in accordance with embodiments of the present disclosure.

Referring now to FIG. 2, selected circuits within personal audio device 10 are shown in a block diagram, which in other embodiments may be placed in whole or in part in other locations such as one or more headphones or earbuds. In embodiments in which a reference microphone R is present, CODEC IC 20 may include an analog-to-digital converter (ADC) 21A for receiving the reference microphone signal from microphone R and generating a digital representation ref of the reference microphone signal. CODEC IC 20 may also include an ADC 21B for receiving the error microphone signal from error microphone E and generating a digital representation err of the error microphone signal, and an ADC 21C for receiving the near speech microphone signal from near speech microphone NS and generating a digital representation ns of the near speech microphone signal. CODEC IC 20 may generate an output for driving speaker SPKR from an amplifier A1, which may amplify the output of a digital-to-analog converter (DAC) 23 that receives the output of a combiner 26. Combiner 26 may combine audio signals is from internal audio sources 24, a pilot signal PILOT generated by pinna proximity detector (PPD) 32, the anti-noise signal generated by ANC circuit 30, which by convention has the same polarity as the noise in reference microphone signal ref and is therefore subtracted by combiner 26, and a portion of near speech microphone signal ns so that the user of personal audio device 10 may hear his or her own voice in proper relation to downlink speech ds, which may be received from radio frequency (RF) integrated circuit 22 and may also be combined by combiner 26. Near speech microphone signal ns may also be provided to RF integrated circuit 22 and may be transmitted as uplink speech to the service provider via antenna ANT.

Figure 3:
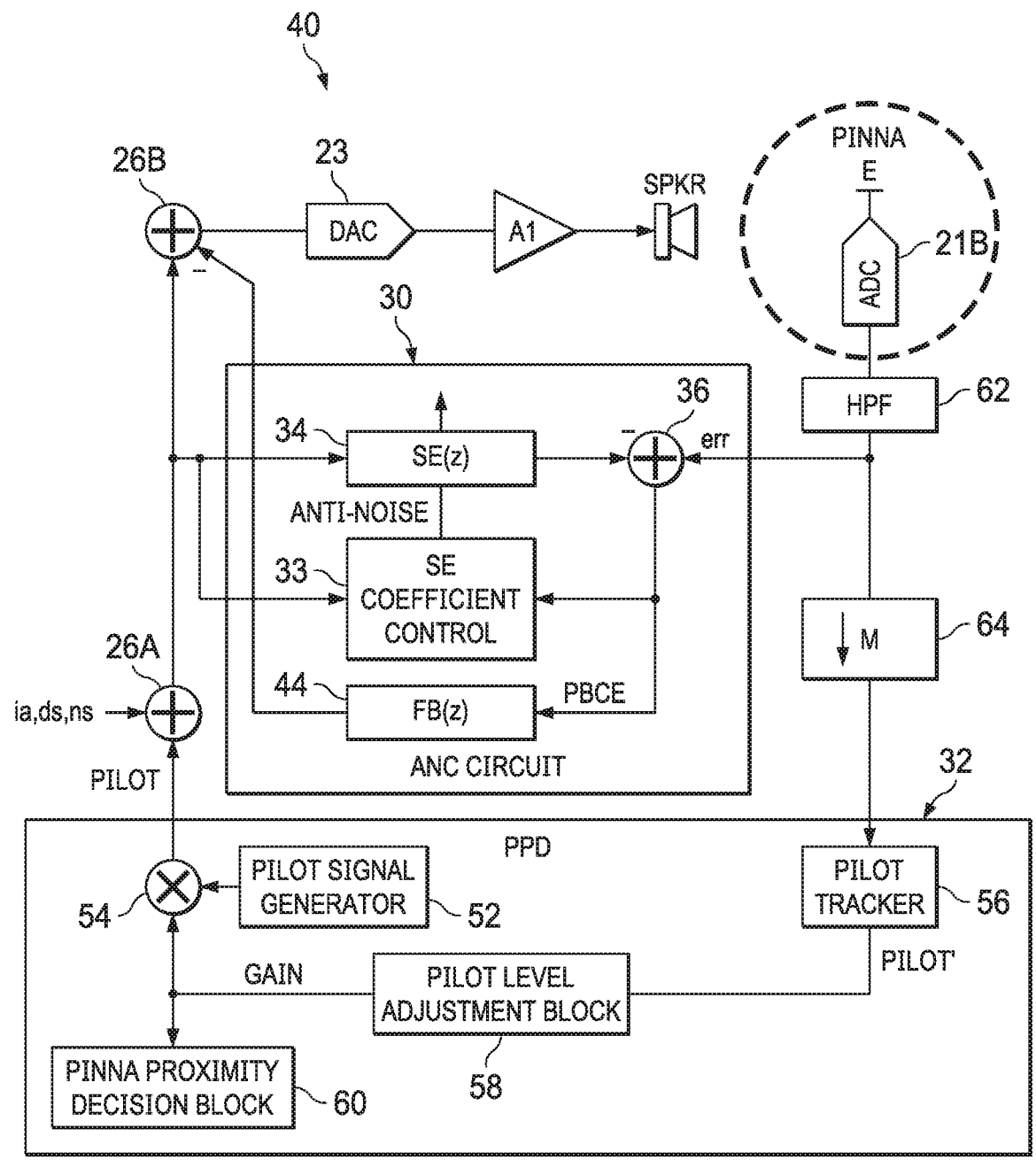
FIG. 3 is a block diagram of a system including selected signal processing circuits and functional blocks within an adaptive noise cancelling circuit and pinna proximity detection circuit of a coder-decoder integrated circuit of FIG. 2, in accordance with embodiments of the present disclosure.

Referring now to FIG. 3, details of a system 40 including selected components of CODEC IC 20, including ANC circuit 30 and PPD 32, are shown in accordance with embodiments of the present disclosure. ANC circuit 30 as shown in FIG. 3 does not include an input for a reference microphone signal, and thus, relies on feedback ANC based on an error microphone signal from error microphone E.

ANC circuit 30 may include an adaptive filter 34 to estimate the response of path S(z), which may have coefficients controlled by SE coefficient control block 33 that may compare a source audio signal (e.g., downlink audio signal ds and/or internal audio signal ia) and a playback-corrected error signal PBCE to generate such coefficients. Playback corrected error signal PBCE may include error microphone signal err after removal of the source audio signal downlink audio signal ds and/or internal audio signal ia, that has been filtered by adaptive filter 34 to represent the expected downlink audio delivered to error microphone E, and which is removed from the output of adaptive filter 34 by a combiner 36 to generate playback-corrected error signal PBCE. SE coefficient control block 33 may correlate the source audio signal (e.g., actual downlink speech signal ds and/or internal audio signal ia) with the components of the source audio signal. In operation, SE coefficient control block 33 may implement an adaptive algorithm, such as a least-means-square algorithm, which may accept the source audio signal as a training signal and playback-corrected error signal PBCE as another input, and may adapt coefficients of adaptive filter 34 in an attempt to minimize playback-corrected error signal PBCE (e.g., in a mean-square sense). In the process of minimizing playback-corrected error signal PBCE, adaptive filter 34 may approach the transfer function of the electro-acoustic path S(z), which may be a function of coupling between speaker SPKR and the pinna of ear 5. Thus, adaptive filter 34 and SE coefficient control block 33 in effect implement an adaptive speaker-to-pinna model to aid the feedback loop including feedback filter 44 to not cancel the playback audio, but rather to cancel only the ambient noise that makes its way through the headset and to the inside of the pinna of ear 5, as observed by error microphone E.

Adaptive filter 34 may thereby be adapted to generate a signal from the source audio signal, that when subtracted from error microphone signal err, includes the content of error microphone signal err that is not due to the source audio signal in order to generate playback-correct error signal PBCE.

In FIG. 3, the function of combiner 26 of FIG. 2 is performed by combiners 26A and 26B. Combiner 26A may combine the source audio signal (e.g., downlink audio signal ds and/or internal audio signal ia) with pilot signal PILOT generated by PPD 32. It is such source audio signal as combined with pilot signal PILOT that may be processed by ANC circuit 30. Combiner 26B may combine the resulting signal of combiner 26A with anti-noise signal ANTI-NOISE to generate an audio output signal to be played back to speaker SPKR.

As depicted in FIG. 3, ANC circuit 30 may also comprise feedback filter 44. Feedback filter 44 may receive the playback corrected error signal PBCE and may apply a response FB(z) to generate a feedback anti-noise signal ANTI-NOISE based on the playback corrected error. Feedback signal ANTI-NOISE may be combined by combiner 26B with the source audio signal and pilot signal PILOT to be reproduced by speaker SPKR.

Pinna proximity detection performed by PPD 32 may begin with a pilot signal generator 52 generating a raw pilot signal, which may include a single low-frequency tone, a group of tones, or a narrow band of non-playback audio having amplitude changes significant enough when speaker SPKR is near the pinna as opposed to away from the pinna. A gain element 54 may apply a gain to the raw pilot signal to generate an ideally human-inaudible pilot signal PILOT that may be combined with the source audio signal via combiner 26A and subsequently added to anti-noise signal ANTI-NOISE via combiner 26B. The resulting audio output signal, including pilot signal PILOT, may be converted into the analog domain by DAC 23, amplified by amplifier A1, and reproduced by speaker SPKR. Error microphone E may receive the combined acoustic signal reproduced by speaker SPKR (which may include pilot signal PILOT), and after conversion of the combined acoustic signal into the digital domain to generate error microphone signal err, a pilot tracker 56 of PPD 32 may isolate pilot signal PILOT from error microphone signal err to generate sensed pilot signal PILOT'.

A pilot level adjustment block 58 may receive sensed pilot signal PILOT' and generate a gain control signal GAIN to control a gain of gain element 54 in order to maintain sensed pilot signal PILOT' at a predetermined constant level. A pinna proximity decision block 60 may receive the gain control signal GAIN generated by pilot level adjustment block 58 and compare the gain indicated by gain control signal GAIN to a gain needed to maintain a constant pilot level when speaker SPKR is not near the pinna of ear 5. Based on such comparison, pinna proximity decision block 60 may determine a proximity between the pinna of ear 5 and speaker SPKR. To illustrate, when speaker SPKR is near the pinna, an acoustic load allows speaker SPKR to efficiently drive pilot signal PILOT, and gain element 54 does not need to provide much (if any) gain to maintain the pilot level at a desired predetermined level. However, when speaker SPKR is not near the pinna, the acoustic load is different and speaker SPKR may be inefficient, meaning gain element 54 must provide more gain in order to preserve the desired predetermined level of pilot signal PILOT as observed at error microphone E.

Figure 4:
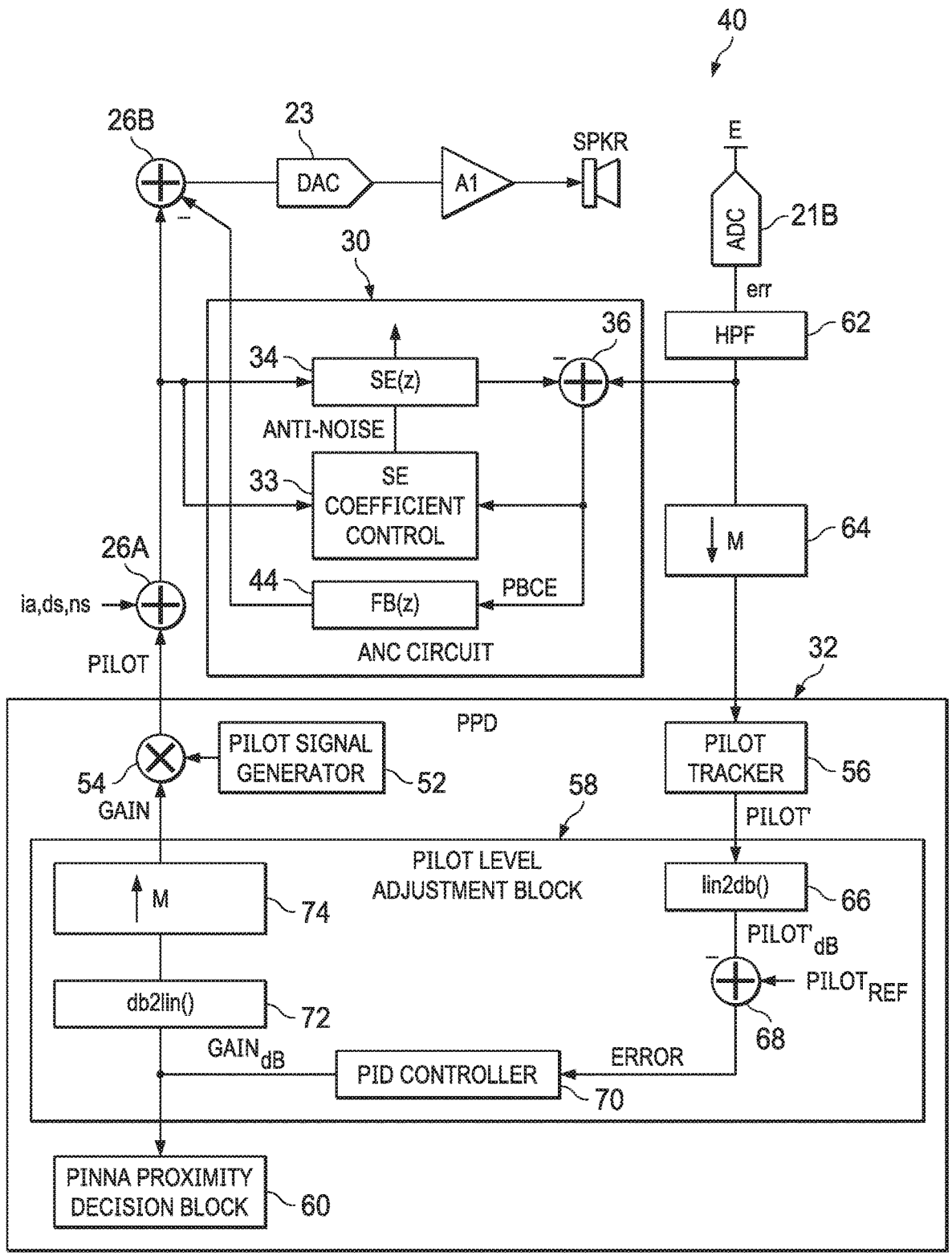
FIG. 4 is a block diagram of the system of FIG. 3, with additional detail showing selected functional components of a pilot level adjustment block, in accordance with embodiments of the present disclosure.

FIG. 4 is a block diagram of the system 40 depicted in FIG. 3, with additional detail showing selected functional components of pilot level adjustment block 58, in accordance with embodiments of the present disclosure. Pilot level adjustment block 58 may implement a proportional-integral-derivative (PID) based adaptive gain control (AGC) loop to automatically and robustly maintain a constant pilot level.

To protect the AGC loop of pilot level adjustment block 58 from direct-current signal components that may falsely driver PID control, a high-pass filter 62 (e.g., with a cutoff frequency of one-tenth of the center of pilot signal PILOT), may filter out low-frequency components of pilot signal PILOT.

In addition, the high-pass filtered pilot signal PILOT may be decimated by decimator 64, to allow the AGC loop of pilot level adjustment block 58 to be operated at a significantly reduced rate, which may reduce processing requirements of the AGC loop.

Pilot level adjustment block 58 may include a linear-to-decibel converter 66 to convert sensed pilot signal PILOT' into a value $PILOT_{dB}'$ given in terms of decibels relative to full-scale magnitude for sensed pilot signal PILOT'. Operation in the decibel domain may enable for compression of the dynamic range of pilot signal PILOT and preservation of the signal for a reasonable number of fixed-point bits.

A combiner 68 may subtract a reference pilot signal $PILOT_{REF}$ from sensed pilot signal $PILOT_{dB}'$ to generate an error signal ERROR. A PID controller 70 may receive the error signal and generate a gain signal $GAIN_{dB}$ in decibels based on the error signal in order to adaptively minimize error signal ERROR. A decibel-to-linear converter 72 may convert the decibel-domain gain signal $GAIN_{dB}$ into a linear scale equivalent, and such converted linear scale equivalent may be interpolated by interpolator 74 to have the same sample frequency as ADC 21B, in order to generate gain signal GAIN.

Figure 5:
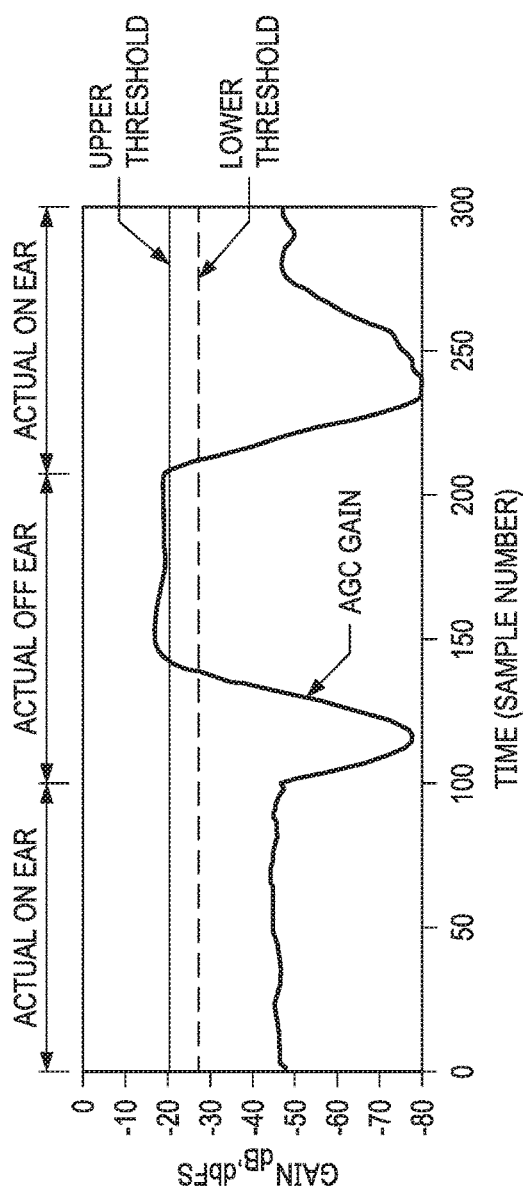
FIG. 5 depicts graphs of example waveforms illustrating how a pinna proximity decision block may use a gain signal to determine a proximity of a speaker to a pinna of an ear, in accordance with embodiments of the present disclosure.
Figure 5:
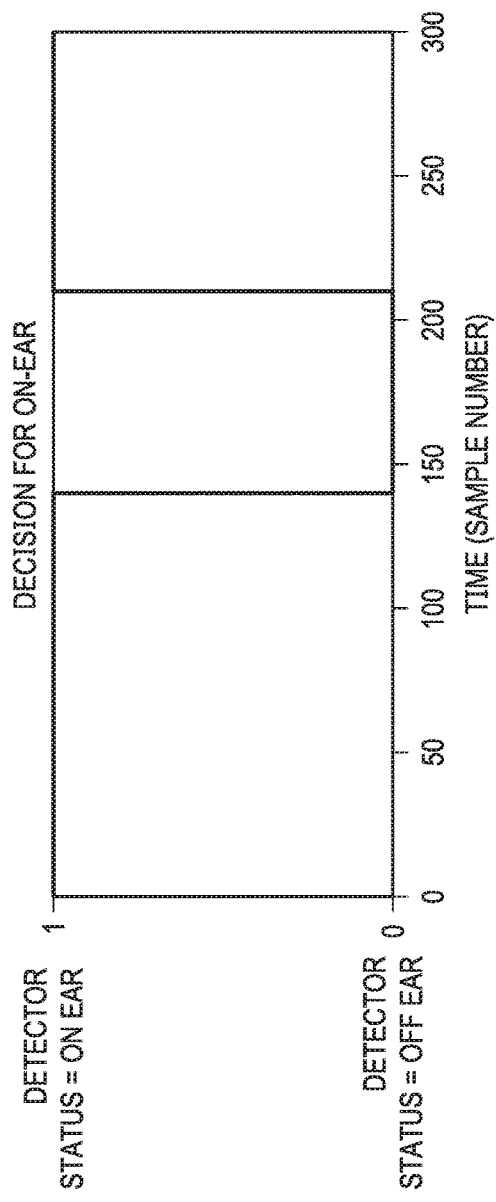

FIG. 5 depicts graphs of example waveforms illustrating how pinna proximity decision block 60 may use decibel-domain gain signal $GAIN_{dB}$ to determine a proximity of speaker SPKR to the pinna of ear 5, in accordance with embodiments of the present disclosure. The top waveform of FIG. 5 depicts decibel-domain gain signal $GAIN_{dB}$ versus time for a time period, the beginning of which a user has a headset on ear, then removes it briefly, then places it back on ear. Pinna decision proximity block 60 may determine whether speaker SPKR is on ear or off ear by comparing decibel-domain gain signal $GAIN_{dB}$ to a pair of thresholds: (i) speaker SPKR may be declared "on ear" when decibel-domain gain signal $GAIN_{dB}$ exceeds an upper threshold; and (ii) speaker SPKR may be declared "off ear" when decibel-domain gain signal $GAIN_{dB}$ falls below a lower threshold.

Figure 6:
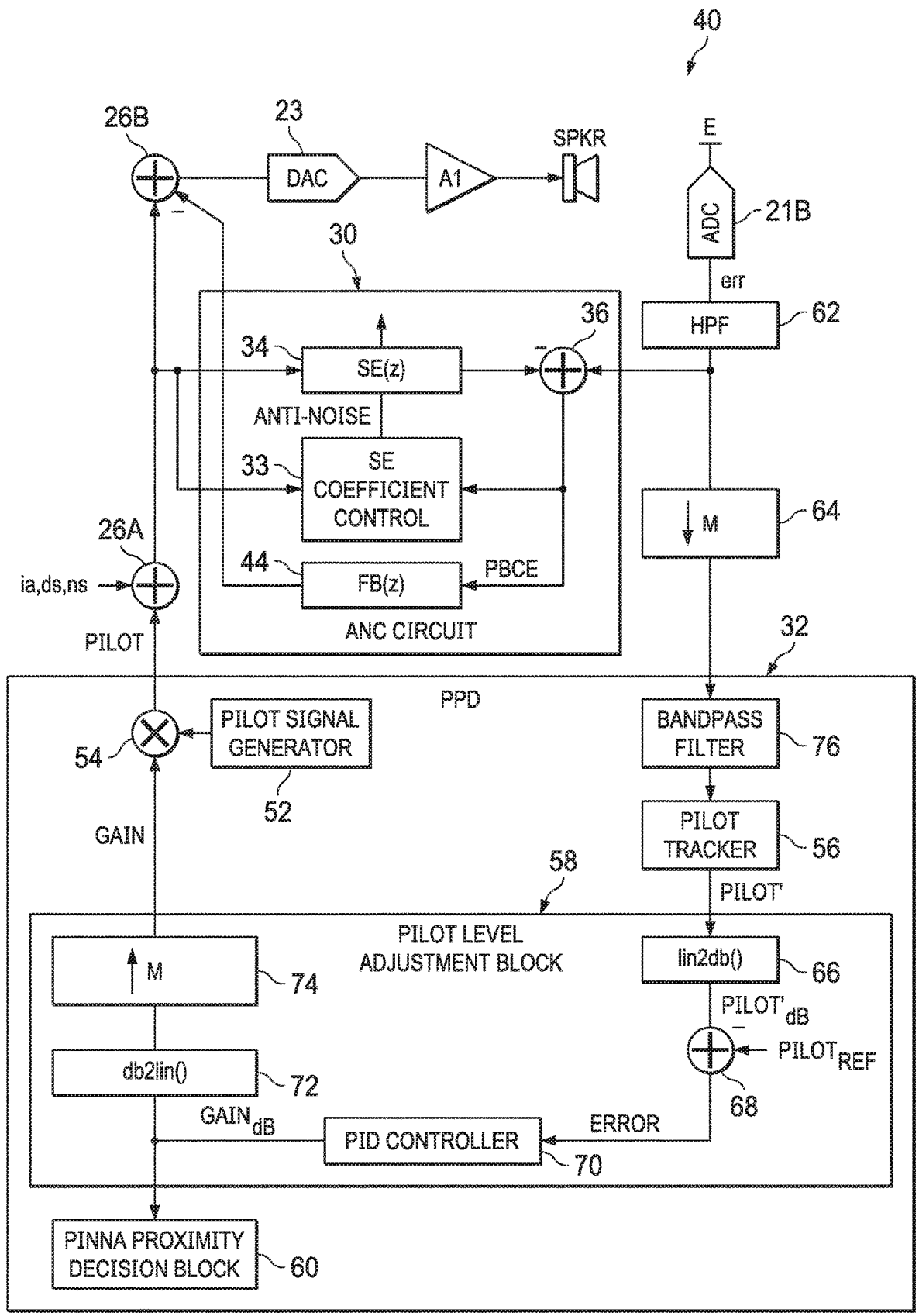
FIG. 6 is a block diagram of the system of FIG. 4, further comprising a bandpass filter for isolating a sensed pilot signal, in accordance with embodiments of the present disclosure.
Figure 7:
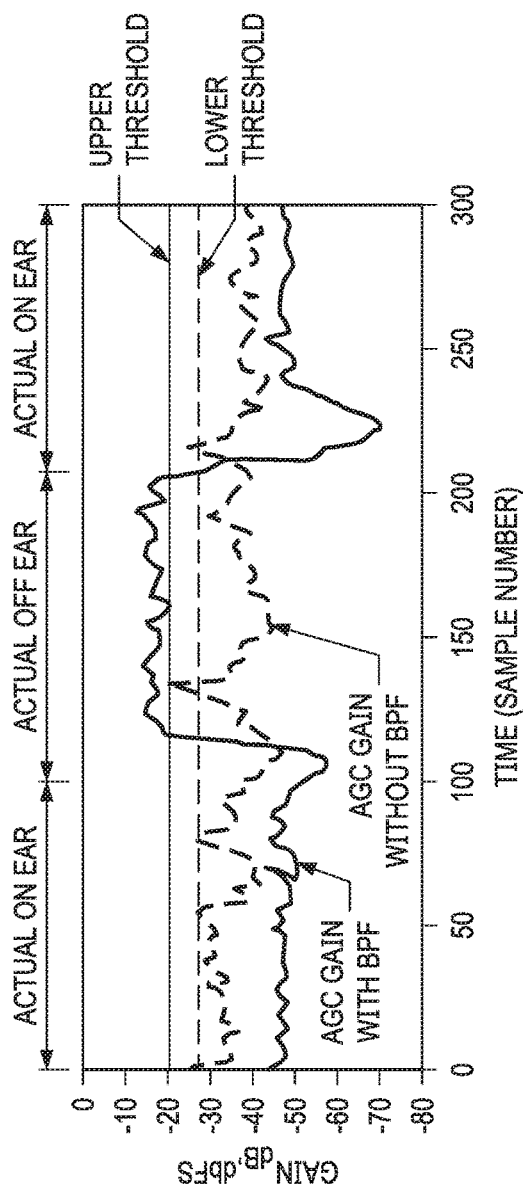
FIG. 7 depicts graphs of example waveforms illustrating operation of a pinna proximity decision block in the presence of a source audio signal near the frequency range of a pilot signal pilot both with bandpass filtering and without bandwidth filtering of an error microphone signal err, in accordance with embodiments of the present disclosure.
Figure 7:
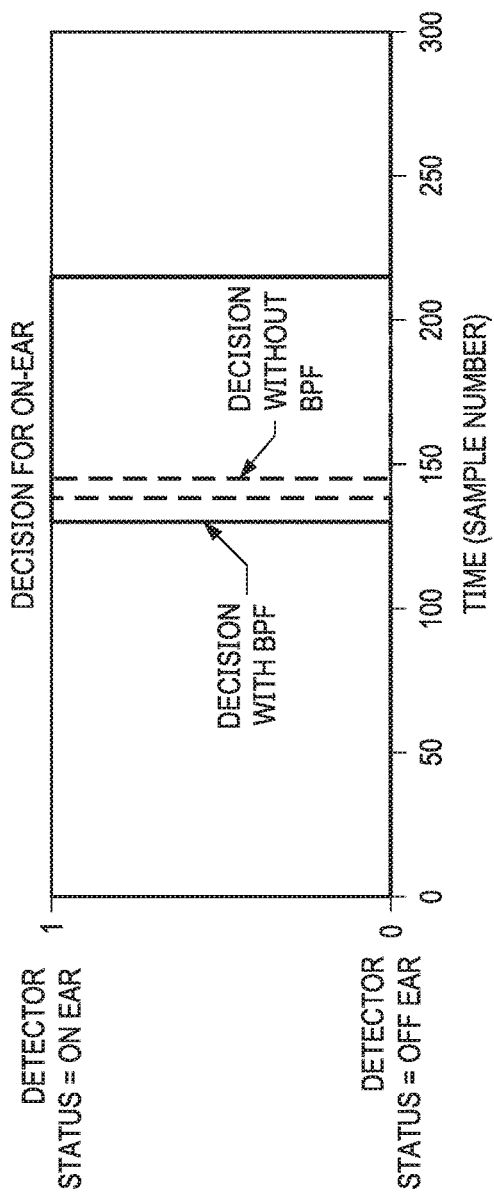

FIG. 6 is a block diagram of system 40 as shown in FIG. 4, further comprising a bandpass filter 76 for isolating sensed pilot signal PILOT' from the source audio signal, in accordance with embodiments of the present disclosure. Because source audio reproduced by speaker SPKR and captured by error microphone E may have signal content near the frequency region of pilot signal PILOT, bandpass filter 76 may filter error microphone signal err in a frequency range near the frequency region of pilot signal PILOT, in order to minimize the influence of the source audio signal on the functionality of PPD 32, and in order to allow pilot tracker 56 to focus on pilot signal PILOT. FIG. 7 depicts graphs of example waveforms illustrating operation of pinna proximity decision block 60 in the presence of a source audio signal near the frequency range of pilot signal pilot both with bandpass filtering and without bandpass filtering of error microphone signal err, in accordance with embodiments of the present disclosure. As shown in FIG. 7, without bandpass filtering of error microphone signal err, pinna proximity detector block 60 may have difficulty in distinguishing sensed pilot signal PILOT' from the source audio signal, and may be able to effectively track sensed pilot signal PILOT' with bandpass filtering of error microphone signal err.

Figure 8:
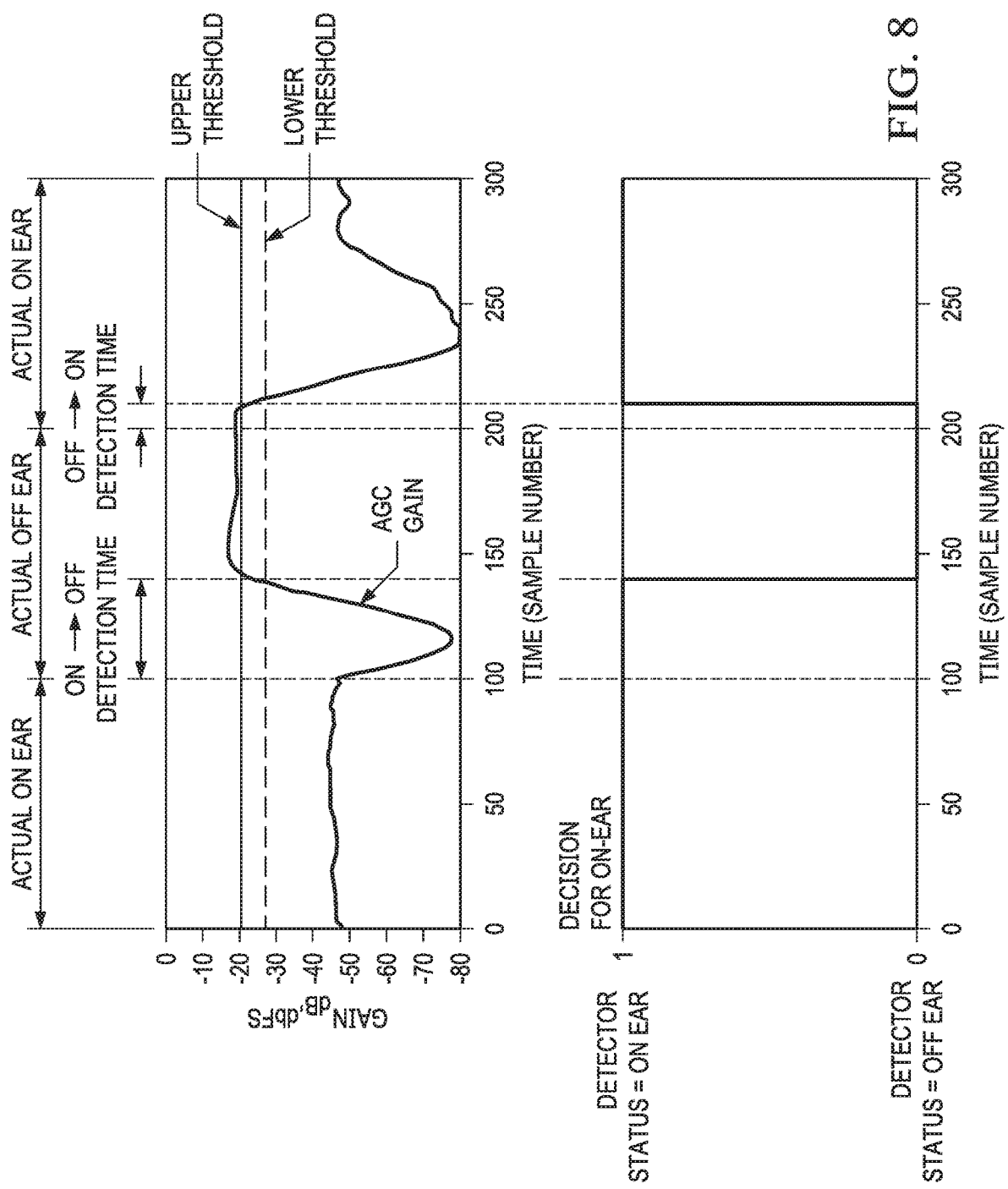
FIG. 8 depicts graphs of example waveforms illustrating operation of a pinna proximity decision block having a delayed detection of on-ear and off-ear events, in accordance with embodiments of the present disclosure.

As speaker SPKR is pulled away from the pinna of ear 5, often there is a brief moment in time when the headset comprising speaker SPKR forms a tighter seal, and the speaker forms an even stronger acoustic coupling to error microphone E. In this case, the gain needed within gain element 54 to maintain pilot signal PILOT at a desired level may be exceedingly small. Similarly, when the headset comprising speaker SPKR is again pushed back onto ear 5, a tighter seal may be briefly formed. In these cases, PPD 32 may take longer to make the correct decision regarding proximity of speaker SPKR to pinna of ear 5 because gain signal GAIN may be temporarily pushed further away from the value at which it will settle, and thus pushed away from the threshold it must cross to indicate an off-ear event. FIG. 8 depicts graphs of example waveforms illustrating this phenomenon, in accordance with embodiments of the present disclosure.

Figure 9:
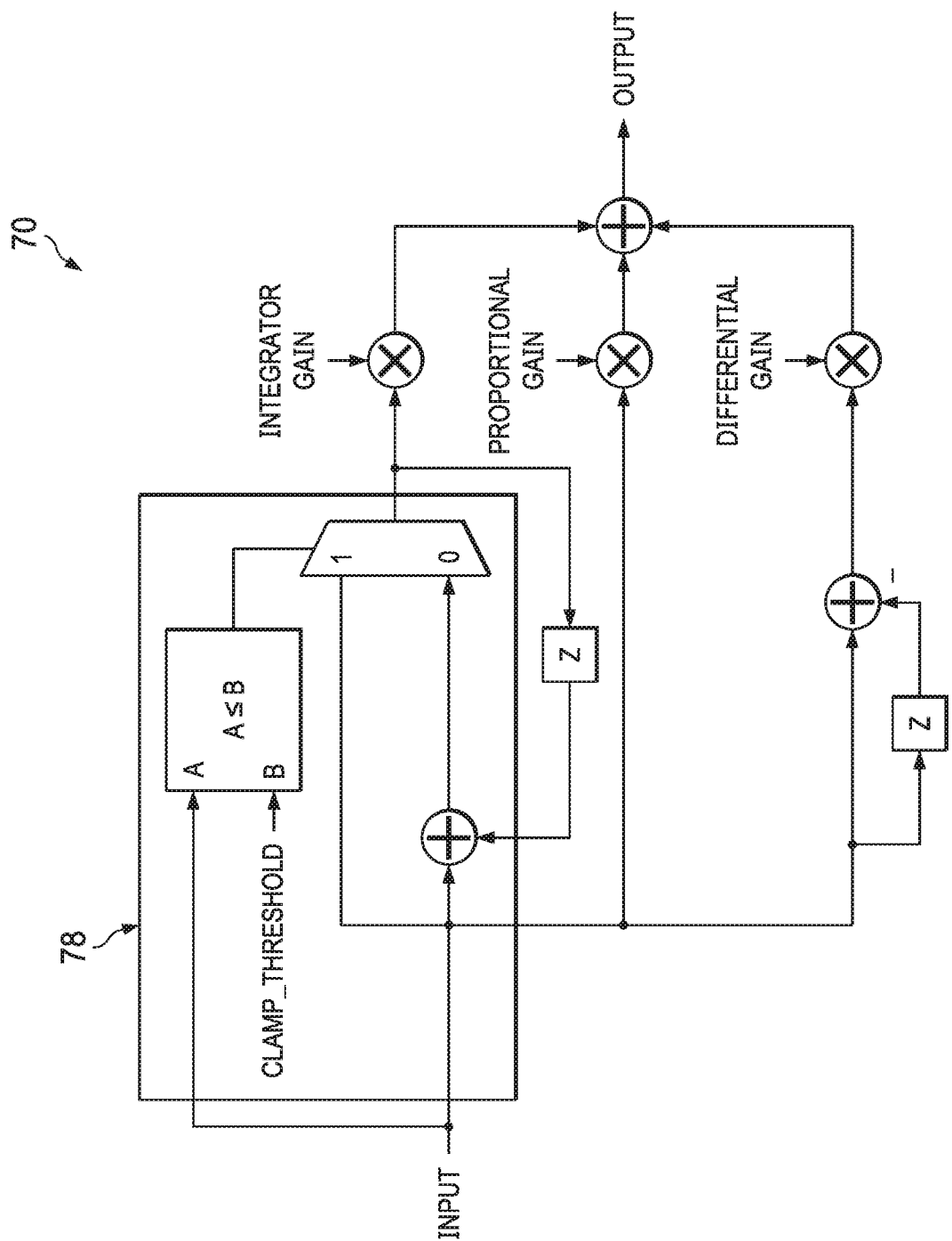
FIG. 9 is a block diagram of selected components of a PID controller, in accordance with embodiments of the present disclosure.
Figure 10:
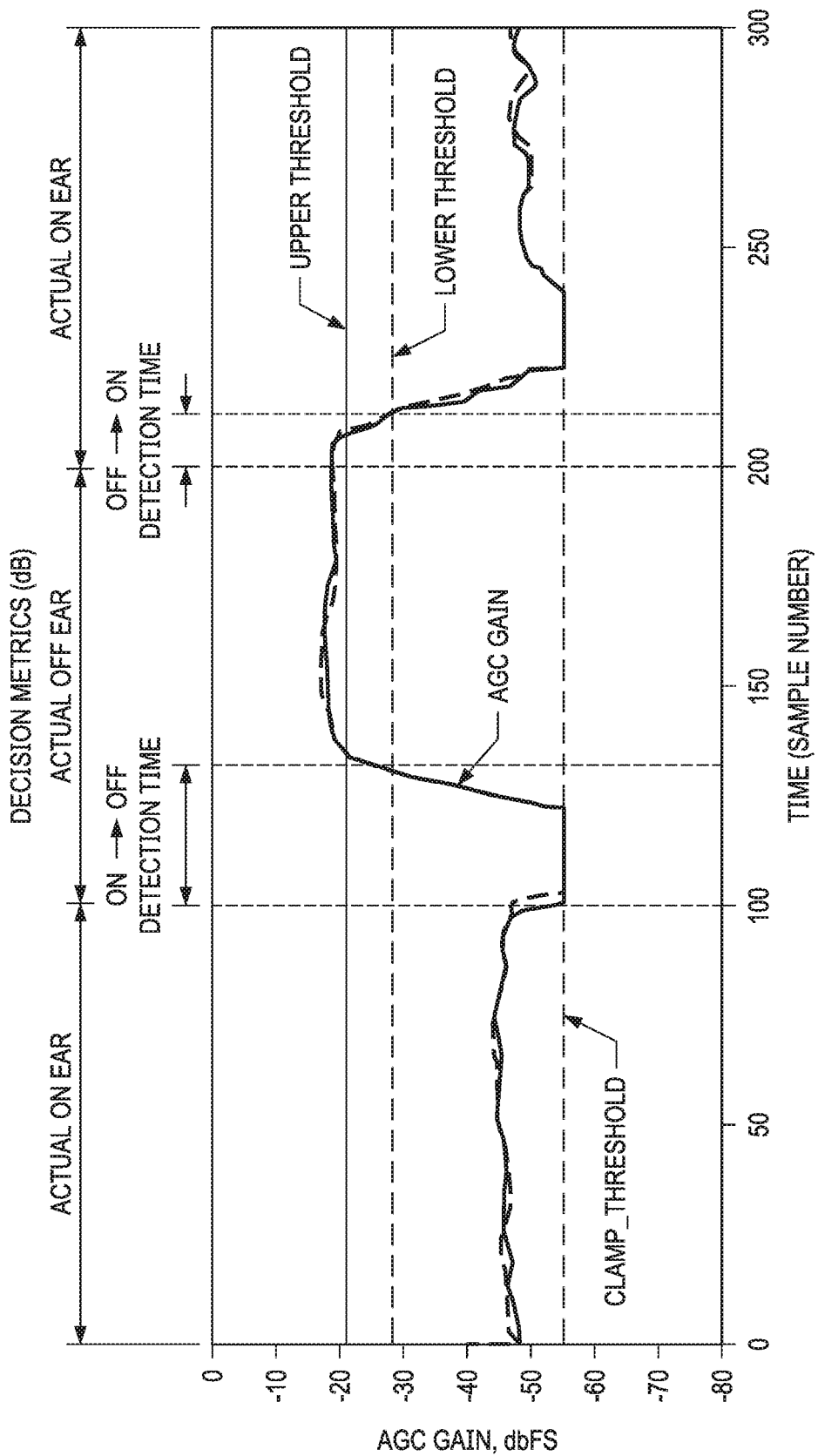
FIG. 10 depicts graphs of example waveforms illustrating operation of a pinna proximity decision block in the presence of clamping within a PID controller, in accordance with embodiments of the present disclosure.

To mitigate this phenomenon, PID controller 70 may include features, in particular a signal clamp, not present in a typical PID controller. FIG. 9 is a block diagram of selected components of PID controller 70, in accordance with embodiments of the present disclosure. As shown in FIG. 9, a clamp 78 may be added to an integral component of a typical PID controller, such that if an input signal INPUT falls below a threshold value CLAMP_THRESHOLD, an output signal OUTPUT of PID controller 70 (which may correspond to decibel-domain gain signal $GAIN_{dB}$) is maintained at the level of CLAMP_THRESHOLD, as depicted in FIG. 10. As shown in FIG. 10, the clamped decibel-domain gain signal $GAIN_{dB}$ may enable reduced settling time at the off-ear value of decibel-domain gain signal $GAIN_{dB}$ as compared to if decibel-domain gain signal $GAIN_{dB}$ was unclamped, as shown in FIG. 8, thus enabling quicker detection of off-ear and on-ear events.

Figure 11:
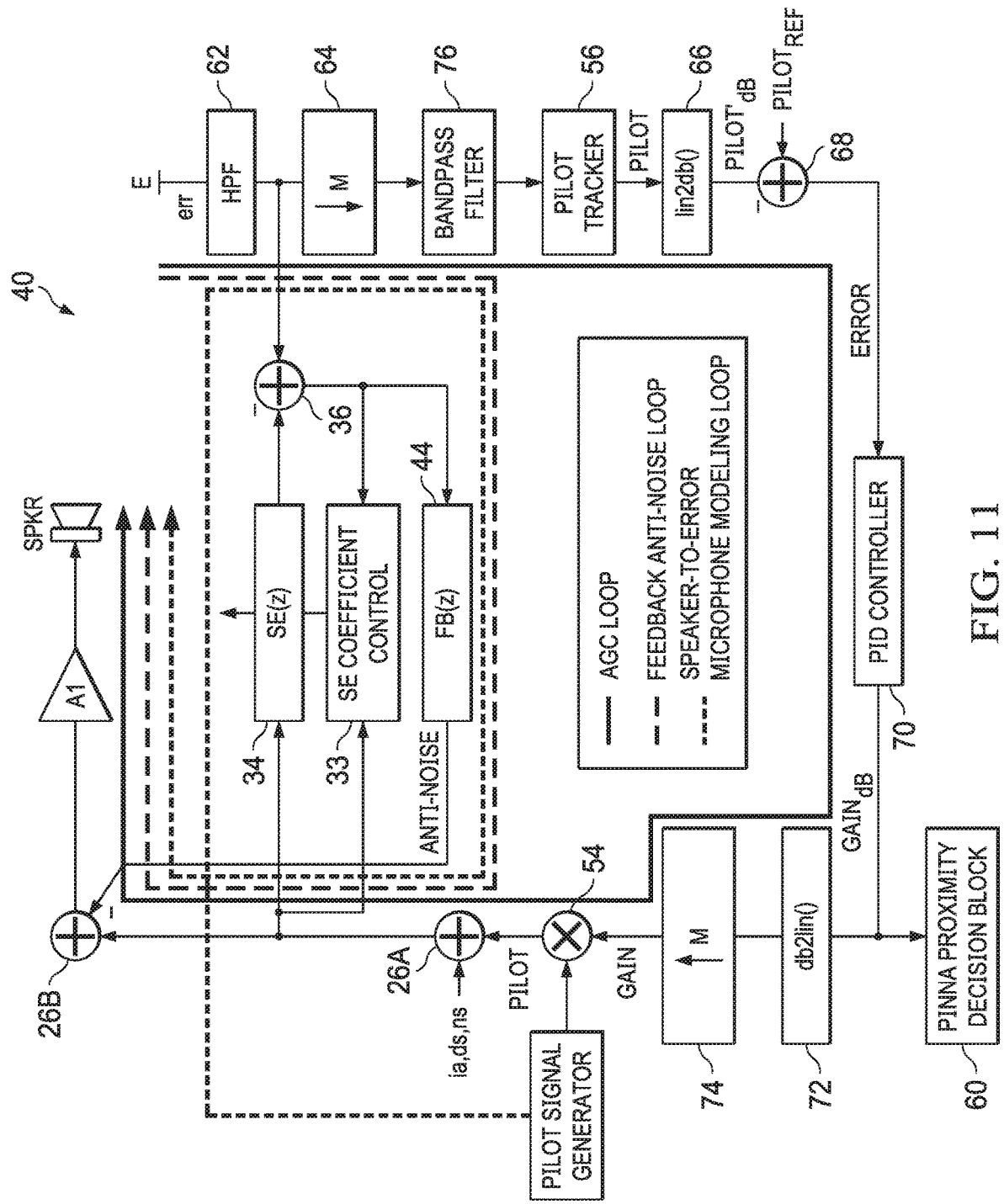
FIG. 11 is a block diagram of the system of FIG. 6, depicting selected components of the system and the various control loops present within the system, in accordance with embodiments of the present disclosure.

FIG. 11 is a block diagram of system 40 as shown in FIG. 6, depicting selected components of system 40 and the various control loops present within the system, in accordance with embodiments of the present disclosure. In particular, FIG. 11 depicts a speaker-to-error microphone modeling loop, an anti-noise feedback loop, and an adaptive gain control loop. Some components of system 40 present in FIG. 6 are not shown in FIG. 11, for the purposes of clarity and exposition.

It may be desirable that the level of pilot signal PILOT be controlled only by the adaptive gain control of PPD 32. However, the level of pilot signal PILOT as seen by error microphone E may also be affected by the interaction of the anti-noise feedback loop and the speaker-to-error microphone modeling loop. As the adaptive speaker-to-error microphone modeling loop attempts to model the acoustic coupling between speaker SPKR and error microphone E, it may do a very poor job of such modeling at low frequencies in a narrow band near that of pilot signal PILOT. This poor modeling in turn may cause the pilot signal at the output of combiner 36 to vary significantly. This varying remnant of pilot signal PILOT may end up within a feedback loop, where it may be cancelled or boosted in a varying manner as it is reproduced by speaker SPKR and is sensed by error microphone E. The AGC loop, in turn, may attempt to automatically adjust the level of pilot signal PILOT. In this case, the AGC loop may not be the sole mechanism controlling pilot signal PILOT, and the AGC loop may accordingly overcompensate or undercompensate, and the AGC loop may become unstable. As a result, not only may PPD 32 make an incorrect decision, but also the adaptive speaker-to-error microphone modeling loop may adapt to a strong pilot signal, and the mis-adaptation that results may cause the adaptive speaker-to-error microphone modeling loop to also become unstable.

Figure 12:
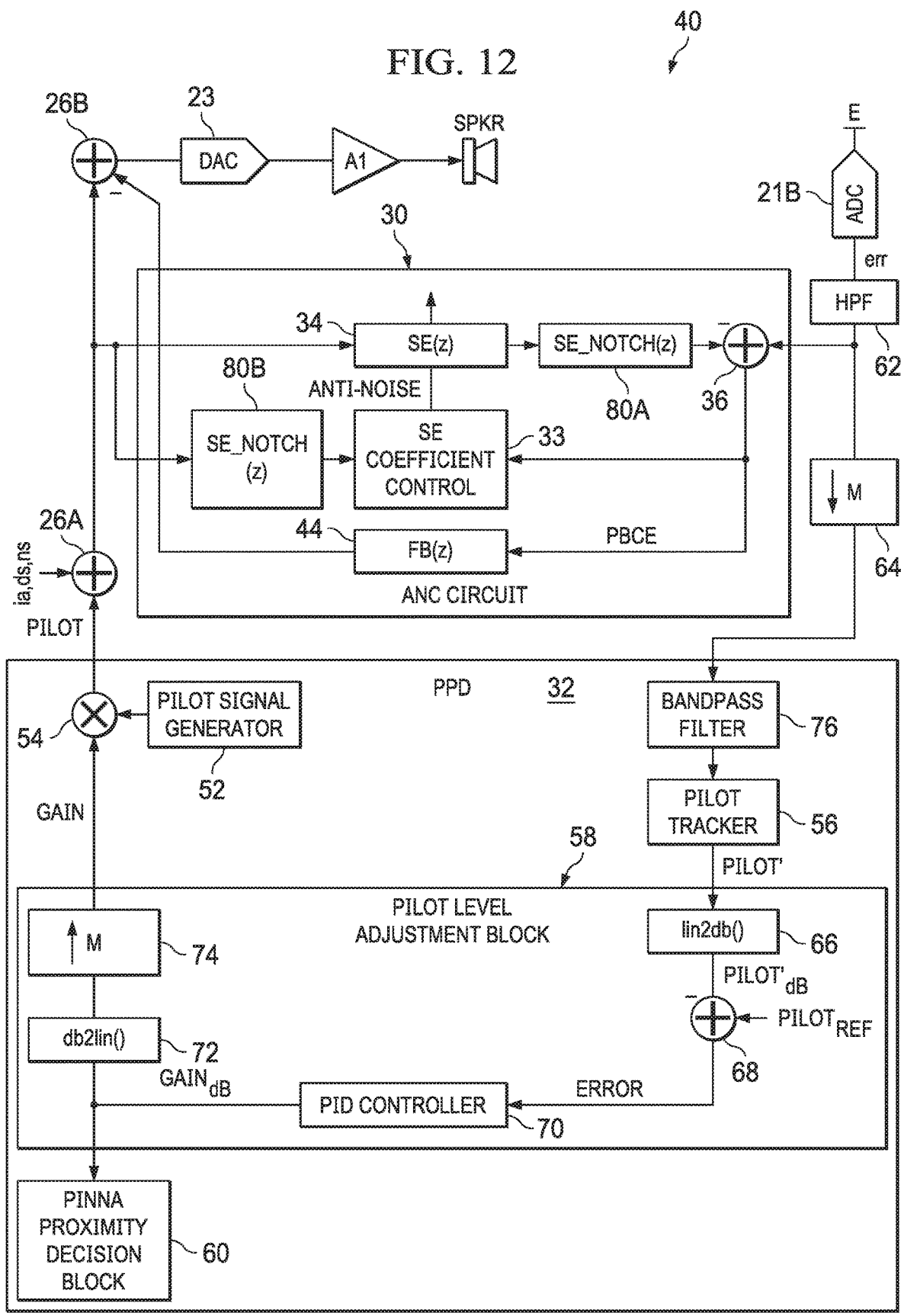
FIG. 12 is a block diagram of the system of FIG. 6, further comprising notch filters within an adaptive noise cancellation circuit, in accordance with embodiments of the present disclosure.

To mitigate this problem, a band-rejection or notch filter 80A with response SE_NOTCH(z) and centered on the center frequency of pilot signal PILOT may be added at the output of adaptive filter 34 as shown in FIG. 12. In addition, due to least-mean-squares stability criteria, an equivalent phase effect of notch filter 80A should be placed inline with the training signal input to SE coefficient control block 33, and thus a copy 80B of notch filter 80A may be placed prior to the training signal input of SE coefficient control block 33. With the presence of notch filters 80A and 80B as shown in FIG. 12, the adaptive speaker-to-error microphone modeling loop and the anti-noise feedback loop may not interact to change the level of pilot signal PILOT, and only the AGC loop implemented by PPD 32 may control the level of pilot signal PILOT. Accordingly, the level of pilot signal PILOT may only change in response to changes in the speaker-to-error microphone coupling as a headset is adjusted on or off the pinna of ear 5. Furthermore, the adaptive speaker-to-error microphone loop may not adapt to pilot signal PILOT itself, as pilot signal PILOT is not part of the speaker-to-error microphone loop's training signal.

Figure 13:
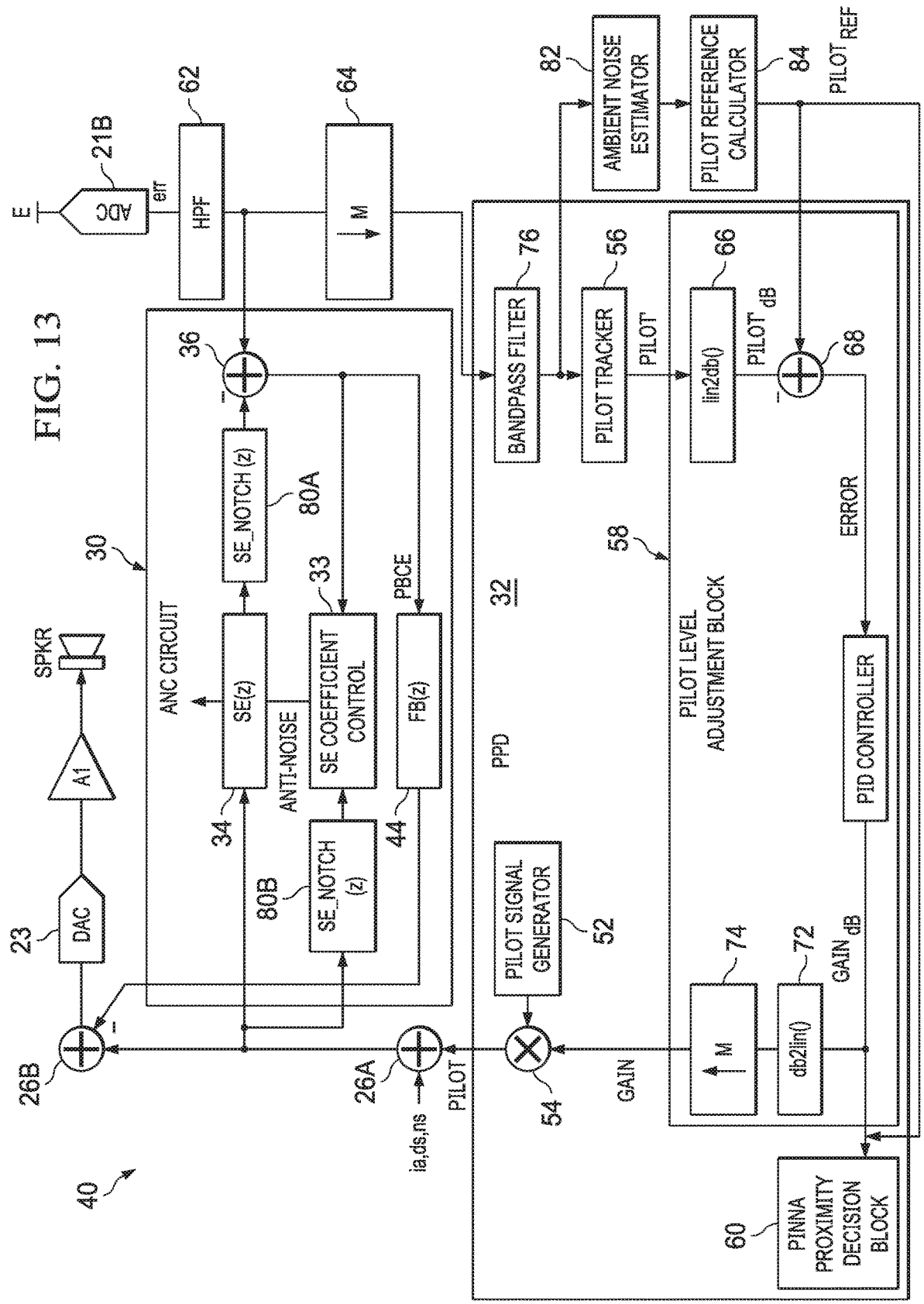
FIG. 13 is a block diagram of the system of FIG. 12, further comprising an ambient noise estimator and a pilot reference calculator, in accordance with embodiments of the present disclosure.
Figure 14:
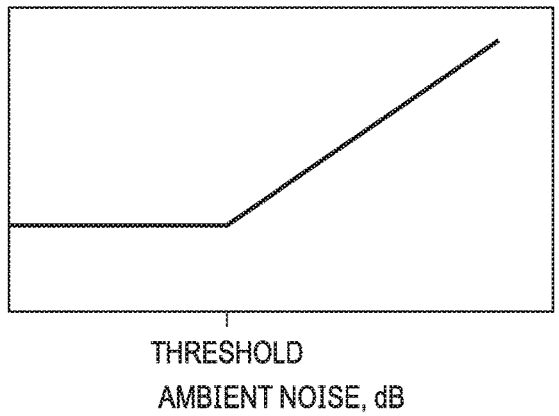
FIG. 14 depicts a graph of an example waveform illustrating calculation of a reference pilot signal as a function of ambient noise, in accordance with embodiments of the present disclosure.
Figure 15:
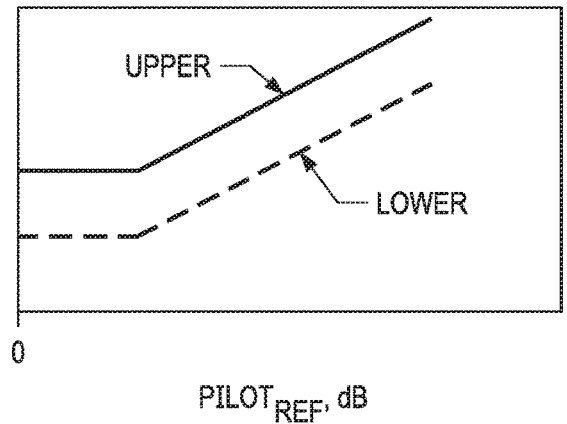
FIG. 15 depicts a graph of example waveforms illustrating calculation of proximity detection thresholds as a function of a reference pilot signal, in accordance with embodiments of the present disclosure.

In the case when the ambient noise (e.g., outside a headset comprising speaker SPKR) is loud, pilot tracker 56 may struggle to follow the pilot signal, and thus PPD 32 may make incorrect decisions regarding the proximity of speaker SPKR to pinna of ear 5. To solve this problem, as shown in FIG. 13, an ambient noise estimator 82 of PPD 32 may estimate an amount of ambient noise present in the sensed pilot signal PILOT'. Approaches to generating an estimate of ambient noise are described elsewhere in this disclosure. Based on the amount of ambient noise present in sensed pilot signal PILOT', a pilot reference calculator 84 of PPD 32 may determine the reference pilot signal $PILOT_{REF}$. For example, in some embodiments, once the ambient noise has increased beyond a minimum noise threshold, reference pilot signal $PILOT_{REF}$ may be increased decibel-per-decibel along with increasing ambient noise, for example as shown in FIG. 14. In addition, pinna proximity decision block 60 may be configured to modify decision thresholds for detecting off-ear and on-ear events to account for the fact that any increase in gain signal GAIN will be at least partly caused by increase in reference pilot signal $PILOT_{REF}$, for example as shown in FIG. 15.

Figure 16:
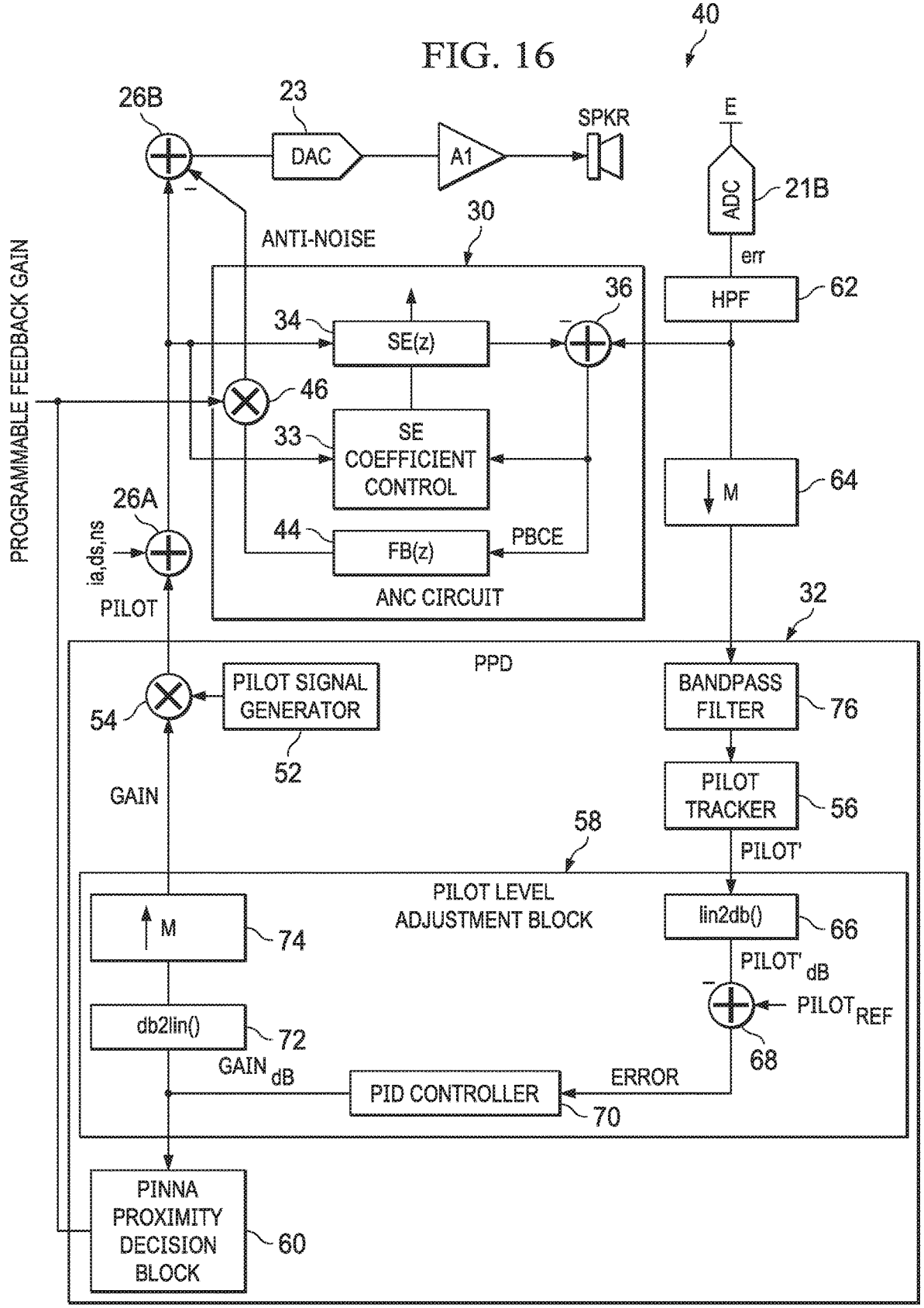
FIG. 16 is a block diagram of the system of FIG. 6, further comprising a programmable gain element for controlling a feedback anti-noise gain, in accordance with embodiments of the present disclosure.

FIG. 16 is a block diagram of the system of FIG. 6, further comprising a programmable gain element 46 for controlling a programmable feedback anti-noise gain, in accordance with embodiments of the present disclosure. As depicted in FIG. 16, a path of the feedback anti-noise may have a programmable gain element 46 in series with feedback filter 44 such that the product of response FB(z) and a gain of programmable gain element 46 is applied to playback corrected error signal PBCE in order to generate anti-noise signal ANTI-NOISE. The gain of programmable gain element 46 may be modified according to user settings input by a user of personal audio device 10. Although feedback filter 44 and gain element 46 are shown as separate components of ANC circuit 30, in some embodiments some structure and/or function of feedback filter 44 and gain element 46 may be combined. For example, in some of such embodiments, an effective gain of feedback filter 44 may be varied via control of one or more filter coefficients of feedback filter 44. To the extent that gain element 46 has variable gain, feedback filter 44 in combination with gain element 46 may be considered an adaptive filter wherein the gain of gain element 46 is analogous to filter coefficients of feedback filter 44.

The varying anti-noise resulting from varying the programmable feedback anti-noise gain may affect the level of pilot signal PILOT detected at error microphone E by either partially cancelling pilot signal PILOT and/or amplifying pilot signal PILOT. Because the programmable feedback anti-noise gain may be modified by a user and may not be anticipated at product design time, pinna proximity decision block 60 may dynamically compensate for the programmable feedback anti-noise gain in order to make the correct speaker-to-ear proximity decision regardless of the programmable feedback anti-noise gain, as shown by the programmable feedback gain being communicated to pinna proximity decision block 60, as shown in FIG. 16.

Figure 17A:
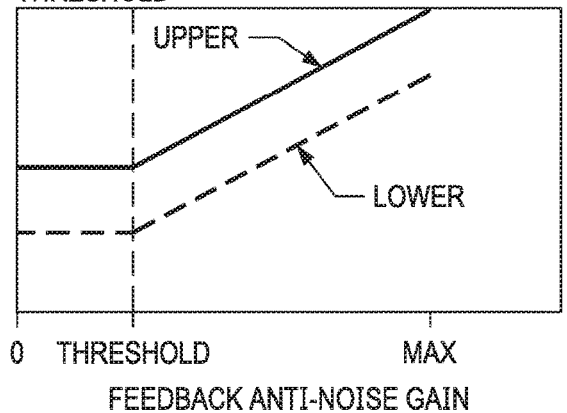
FIGS. 17A and 17B each depict a graph of example waveforms illustrating calculation of proximity detection thresholds as a function of feedback anti-noise gain, in accordance with embodiments of the present disclosure.
Figure 17B:
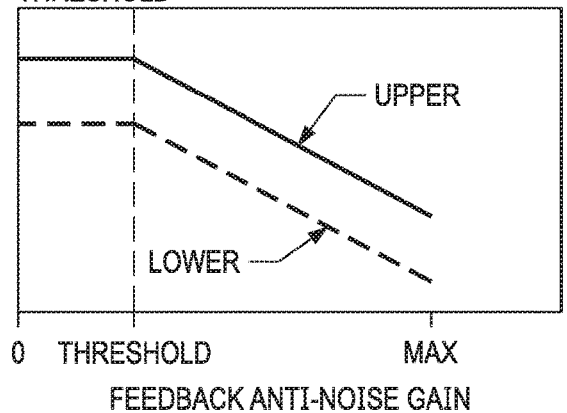

Adjusting the proximity detection thresholds used by pinna proximity decision block 60 responsive to changes to the programmable feedback anti-noise gain may be based on whether increasing the programmable feedback anti-noise gain partially cancels or boosts pilot signal PILOT. For example, at product design time of personal audio device 10, testing equipment may measure how much effect (if any) the anti-noise feedback loop has on pilot signal PILOT when the programmable feedback anti-noise gain is set to its maximum. In the case that the anti-noise feedback loop partially cancels pilot signal PILOT, decision thresholds of pinna proximity decision block 60 may increase with increasing the programmable feedback anti-noise gain, as shown in FIG. 17A. On the other hand, in the case that the anti-noise feedback loop partially boosts pilot signal PILOT, decision thresholds of pinna proximity decision block 60 may decrease with increasing programmable feedback anti-noise gain, as shown in FIG. 17B.

Figure 18:
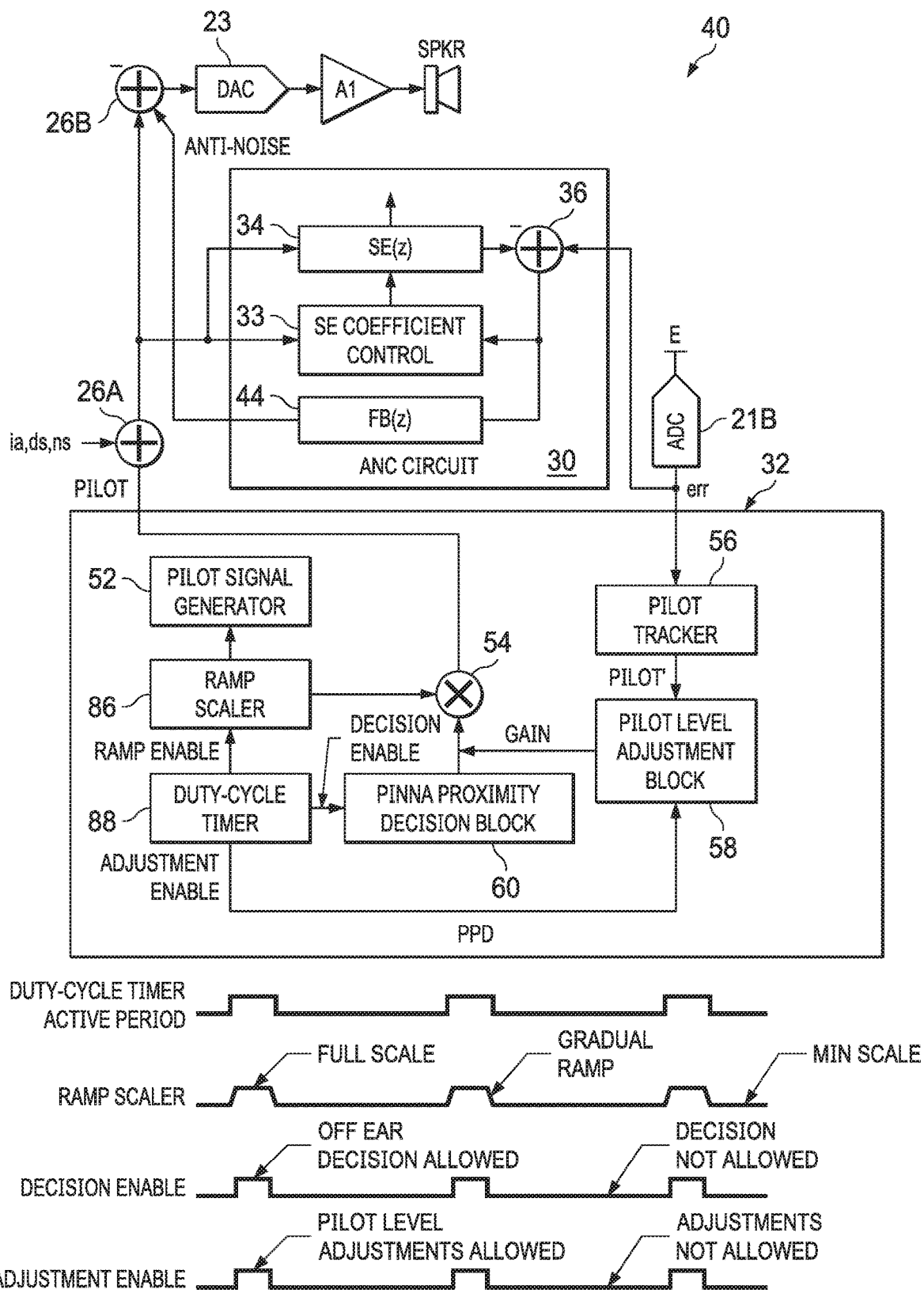
FIG. 18 is a block diagram of the system of FIG. 3, further comprising circuitry for duty cycling pinna proximity detection, in accordance with embodiments of the present disclosure.

FIG. 18 is a block diagram of system 40 as shown in FIG. 3, further comprising circuitry for duty cycling pinna proximity detection, in accordance with embodiments of the present disclosure. In cases in which there is no playback audio and no anti-noise, it may remain desirable to use PPD 32. However, to reduce power consumption and maximize battery life, it may be desirable to duty cycle functionality of PPD 32.

As shown in FIG. 18, PPD 32 may include a ramp scaler 86 and a duty-cycle timer 88. In operation, duty-cycle timer 88 may go active for a brief amount of time at regular intervals (e.g., is active for one second out of each ten second period). Duty-cycle timer 88 may generate control signals for enabling operation of pilot level adjustment block 58 (indicated by "Adjustment Enable" in FIG. 18), enabling operation of pinna proximity decision block 60 (indicated by "Decision Enable" in FIG. 18), and enabling operation of ramp scaler 86 (indicated by "Ramp Enable" in FIG. 18). Thus, as shown in the waveforms depicted at the bottom of FIG. 18, when duty-cycle timer 88 is active, it may enable operation of pilot level adjustment block 58, pinna proximity decision block 60, and ramp scaler 86. When enabled, ramp scaler 86 may, at the beginning of each duty cycle active period, ramp a gain to be applied to the signal generated by pilot signal generator 52 from a minimum gain (e.g., zero) to a maximum gain (e.g., unity), and at the end of each duty cycle active period, ramp a gain to be applied to the signal generated by pilot signal generator 52 from the maximum gain to the minimum gain. Such ramping may minimize the occurrence of audio artifacts caused by application of the periodic pilot signal.

During the durations in which ramp scaler 86 is ramping up and ramping down its gain, the AGC loop of PPD 32 is not responsible for the pilot level, and thus pinna proximity detection should be frozen, and adjustments to the pilot level should be disabled, as shown in FIG. 18. When pilot signal PILOT is muted by ramp scaler 86, the most recent proximity decision may be held until the next active period of duty-cycle timer 88.

Accordingly, pilot signal PILOT may be non-zero for a brief amount of time at regular intervals, and power savings may be achieved by not having the drive amplifier A1 and speaker SPKR with a continuous signal.

Figure 19:
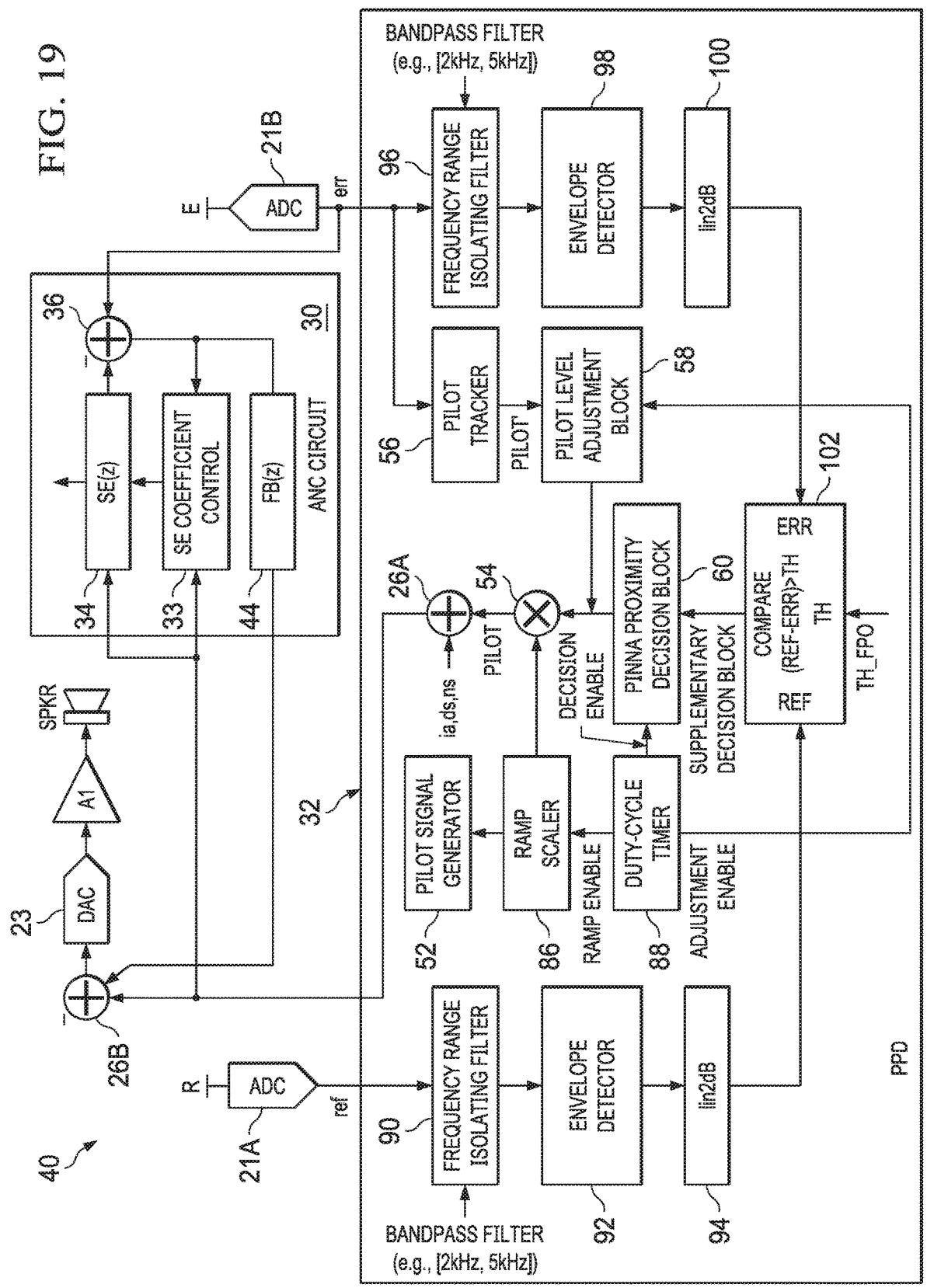
FIG. 19 is a block diagram of the system of FIG. 18, further comprising circuitry for pinna proximity detection based on forward passive occlusion, in accordance with embodiments of the present disclosure.

FIG. 19 is a block diagram of system 40 as shown in FIG. 18, further comprising circuitry for pinna proximity detection based on forward passive occlusion, in accordance with embodiments of the present disclosure. As mentioned above in reference to FIGS. 1A, 1B, and 2, personal audio device 10 may include a reference microphone for sensing ambient sound. The addition of reference microphone R to system 40 may enable an additional pinna proximity detection by a technique known as forward passive occlusion. By comparing the sound energies in a specific frequency band at both reference microphone R and error microphone E, PPD 32 may take advantage of physical properties of a headset (e.g., headphone 18A, 18B of FIG. 1B) and the fact that higher frequencies (e.g., in the band from 2 KHz to 5 KHz) may show a significant difference when the headset is on ear (due to the sound-blocking effect of the headset) and off ear. This extra information may be used in lieu of the pilot signal-based decision, or it may supplement the pilot signal-based decision to build more confidence in the final decision.

As shown in FIG. 19, PPD 32 may also include a frequency-range isolating filter 90 configured to receive and bandpass filter reference microphone signal ref, an envelope detector 92 for detecting a signal envelope of reference microphone signal ref in the bandpass filter range, and a linear-to-decibel converter 94 configured to convert the envelope detected, bandpass-filtered reference microphone signal into a value $REF_{dB}$ given in terms of decibels relative to full-scale magnitude for reference microphone signal ref. Similarly, PPD 32 may also include a frequency-range isolating filter 96 configured to receive and bandpass filter error microphone signal err, an envelope detector 98 for detecting a signal envelope of error microphone signal err in the bandpass filter range, and a linear-to-decibel converter 100 configured to convert the envelope detected, bandpass-filtered error microphone signal into a value $ERR_{dB}$ given in terms of decibels relative to full-scale magnitude for error microphone signal err. A supplementary decision block 102 may compare a difference between value $REF_{dB}$ and $ERR_{dB}$, compare such difference to a threshold TH_FPO, and communicate a signal to pinna proximity decision block 60 that may override or supplement the proximity decision made by pinna proximity decision block 60.

Figure 20:
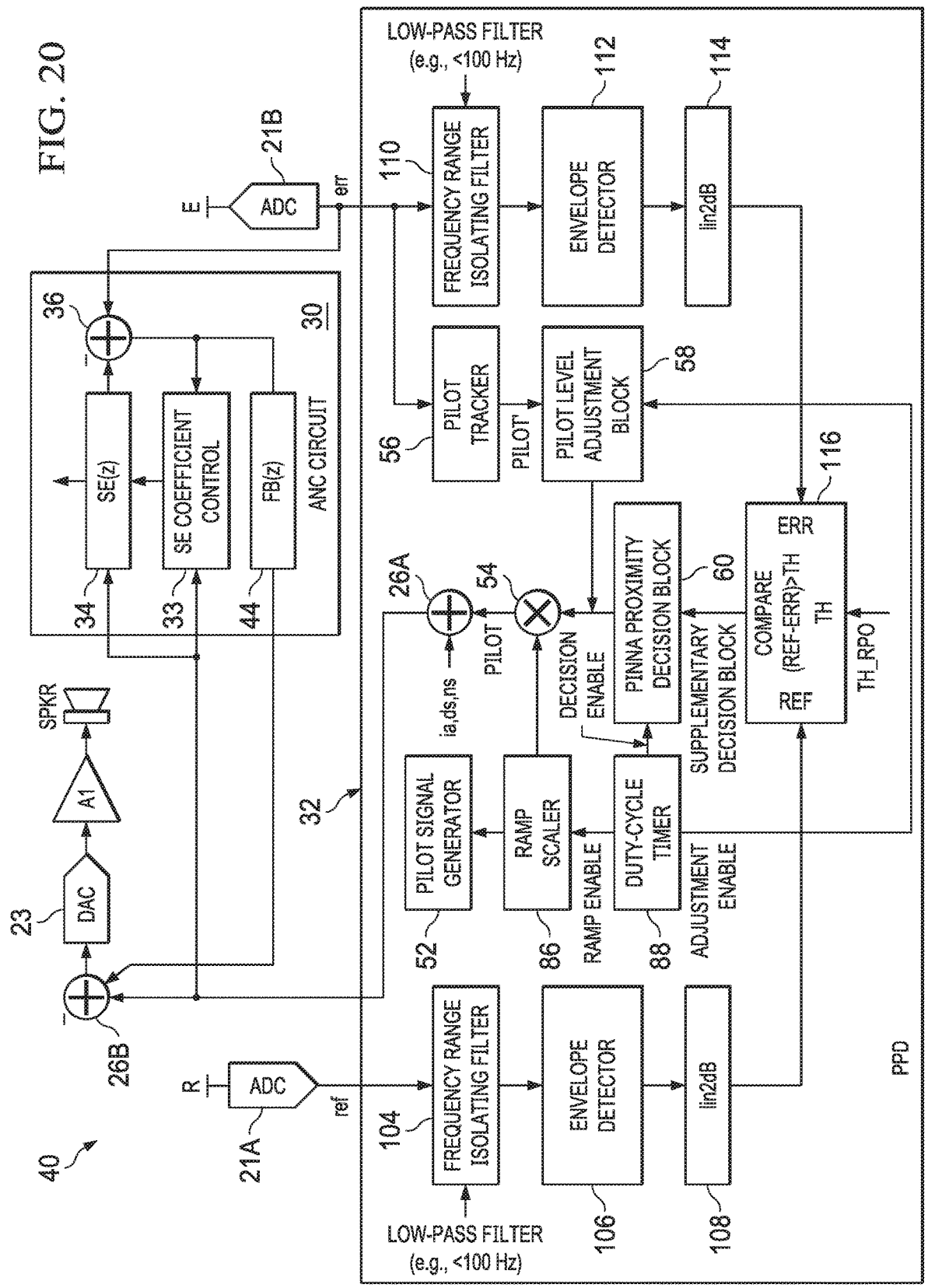
FIG. 20 is a block diagram of the system of FIG. 19, with circuitry for pinna proximity detection based on reverse passive occlusion added in lieu of circuitry for pinna proximity detection based on forward passive occlusion, in accordance with embodiments of the present disclosure.

FIG. 20 is a block diagram of system 40 as shown in FIG. 19, with circuitry for pinna proximity detection based on reverse passive occlusion added in lieu of circuitry for pinna proximity detection based on forward passive occlusion, in accordance with embodiments of the present disclosure. Presence of reference microphone R in system 40 may enable an additional pinna proximity detection by a technique known as reverse passive occlusion. By comparing the sound energies in a specific frequency band at both reference microphone R and error microphone E, PPD 32 may take advantage of physical properties of a headset (e.g., headphone 18A, 18B of FIG. 1B) and the fact that lower frequencies (e.g., below 100 Hz) may show a significant difference when the headset is on ear (e.g., due to bone conduction resulting jaw movement, joint vibrations within a head due to neck movement) and off ear. For instance, error microphone E may receive bone conduction effects while reference microphone R may not, and bone conduction effects may only occur during an on-ear condition. Accordingly, this extra information may be used in lieu of the pilot signal-based decision and/or forward passive occlusion-based decision, or it may supplement the pilot signal-based decision and/or forward passive occlusion-based decision to build more confidence in the final decision.

As shown in FIG. 20, PPD 32 may also include a frequency-range isolating filter 104 configured to receive and low-pass filter reference microphone signal ref, an envelope detector 106 for detecting a signal envelope of reference microphone signal ref in the low-pass filter range, and a linear-to-decibel converter 108 configured to convert the envelope detected, low-pass-filtered reference microphone signal into a value $REF_{dB}$ given in terms of decibels relative to full-scale magnitude for reference microphone signal ref. Similarly, PPD 32 may also include a frequency-range isolating filter 110 configured to receive and low-pass filter error microphone signal err, an envelope detector 112 for detecting a signal envelope of error microphone signal err in the low-pass filter range, and a linear-to-decibel converter 114 configured to convert the envelope detected, low-pass-filtered error microphone signal into a value $ERR_{dB}$ given in terms of decibels relative to full-scale magnitude for error microphone signal err. A supplementary decision block 116 may compare a difference between value $REF_{dB}$ and $ERR_{dB}$, compare such difference to a threshold TH_RPO, and communicate a signal to pinna proximity decision block 60 that may override or supplement the proximity decision made by pinna proximity decision block 60 and/or supplementary decision block 102.

Figure 21:
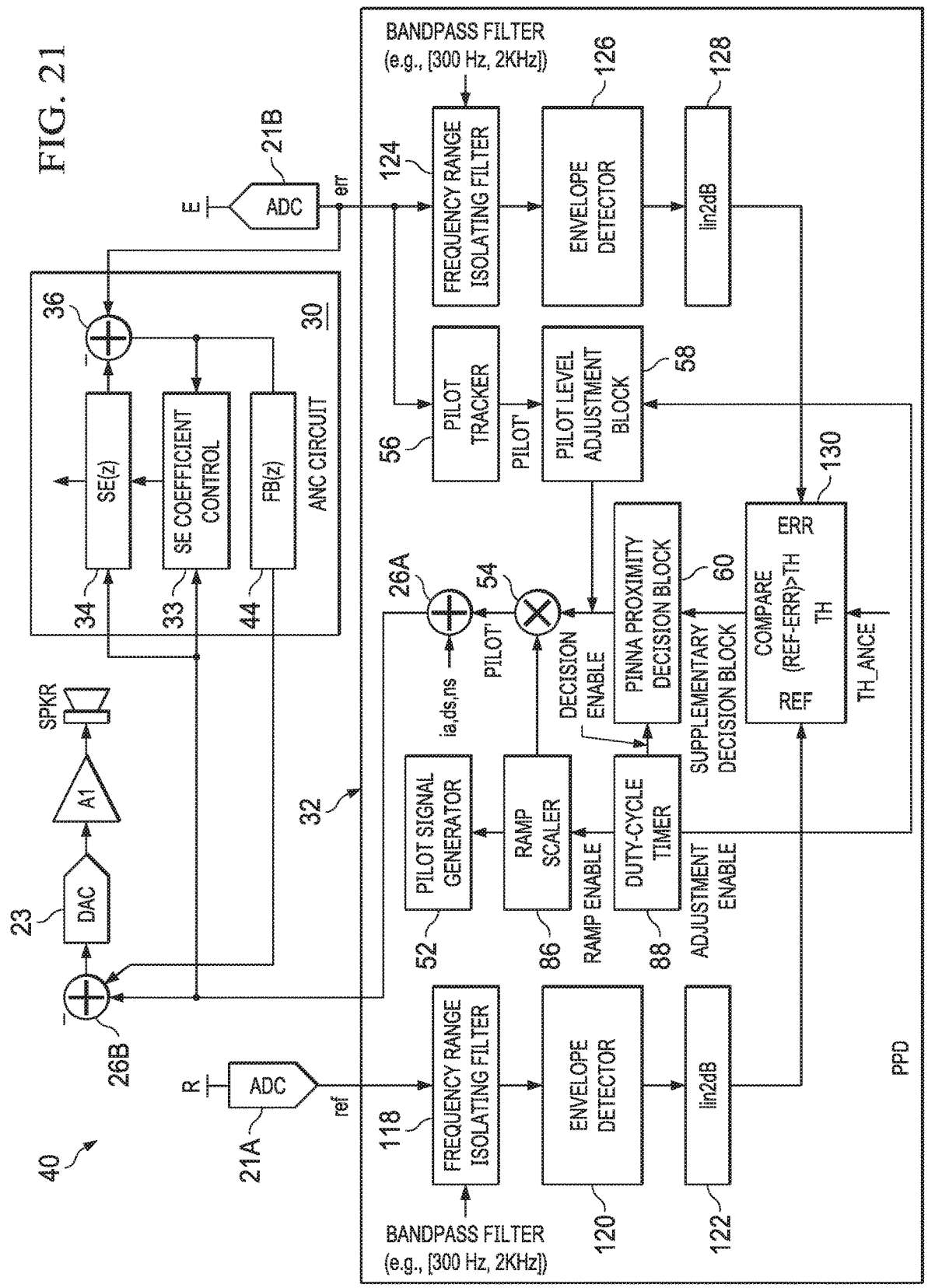
FIG. 21 is a block diagram of the system of FIG. 19, with circuitry for pinna proximity detection based on the active noise cancellation effect added in lieu of circuitry for pinna proximity detection based on forward passive occlusion, in accordance with embodiments of the present disclosure.

FIG. 21 is a block diagram of system 40 as shown in FIG. 19, with circuitry for pinna proximity detection based on active noise cancellation effect added in lieu of circuitry for pinna proximity detection based on forward passive occlusion, in accordance with embodiments of the present disclosure. Presence of reference microphone R in system 40 may enable an additional pinna proximity detection by a technique known as the active noise cancellation effect. By comparing the sound energies in a specific frequency band at both reference microphone R and error microphone E, PPD 32 may take advantage of physical properties of a headset (e.g., headphone 18A, 18B of FIG. 1B) and the fact that middle frequencies (e.g., from 300 Hz to 2 KHz) may show a significant difference when the headset is on ear (e.g., due to active noise cancellation effects) and off ear. Accordingly, this extra information may be used in lieu of the pilot signal-based decision, forward passive occlusion-based decision, and/or reverse passive occlusion-based decision, or it may supplement the pilot signal-based decision, forward passive occlusion-based decision, and/or reverse passive occlusion-based decision to build more confidence in the final decision.

As shown in FIG. 21, PPD 32 may also include a frequency-range isolating filter 118 configured to receive and bandpass filter reference microphone signal ref, an envelope detector 120 for detecting a signal envelope of reference microphone signal ref in the bandpass filter range, and a linear-to-decibel converter 122 configured to convert the envelope detected, bandpass-filtered reference microphone signal into a value $REF_{dB}$ given in terms of decibels relative to full-scale magnitude for reference microphone signal ref. Similarly, PPD 32 may also include a frequency-range isolating filter 124 configured to receive and bandpass filter error microphone signal err, an envelope detector 126 for detecting a signal envelope of error microphone signal err in the bandpass filter range, and a linear-to-decibel converter 128 configured to convert the envelope detected, bandpass-filtered error microphone signal into a value $ERR_{dB}$ given in terms of decibels relative to full-scale magnitude for error microphone signal err. A supplementary decision block 130 may compare a difference between value $REF_{dB}$ and $ERR_{dB}$, compare such difference to a threshold TH_ANCE, and communicate a signal to pinna proximity decision block 60 that may override or supplement the proximity decision made by pinna proximity decision block 60, supplementary decision block 102, and/or supplementary decision block 116.

Figure 22:
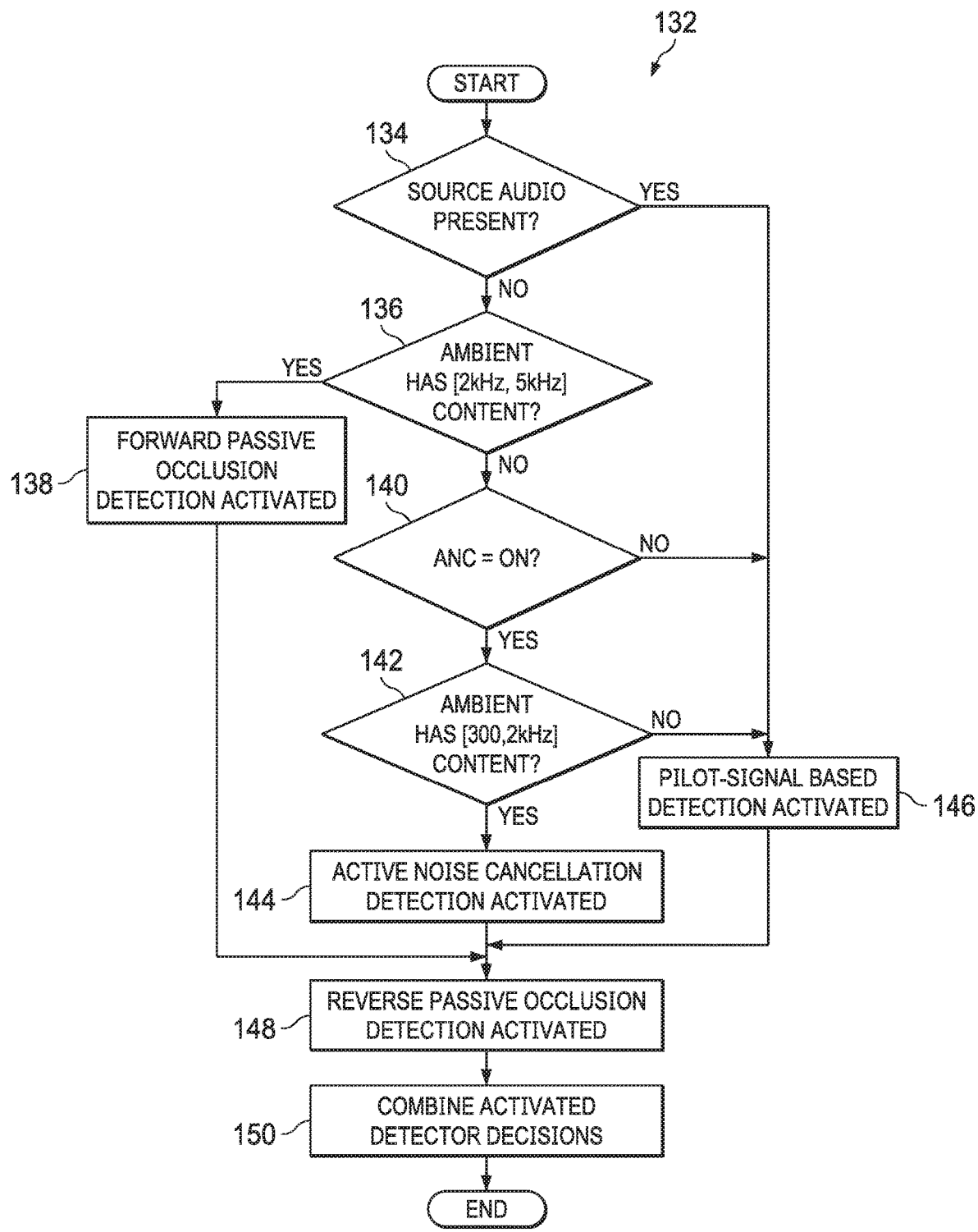
FIG. 22 is a flow chart of an example method for selecting and combining pinna proximity detection techniques according to system operational parameters, in accordance with embodiments of the present disclosure.

By employing multiple pinna proximity methods (pilot signal-based, forward passive occlusion, reverse passive occlusion, and active noise cancellation effect) according to the ambient and/or listening scenario (e.g., whether source audio is present or not, whether ANC is ON or not), PPD 32 may use the best detector for the scenario. Furthermore, PPD 32 may combine detector decisions to a product for a potentially more robust pinna proximity decision. FIG. 22 is a flow chart of an example method 132 for selecting and combining pinna proximity detection techniques according to system operational parameters, in accordance with embodiments of the present disclosure. In some embodiments, method 132 may be executed by pinna proximity decision block 60 or another component of PPD 32.

Method 132 may start at step 134, in which PPD 32 may determine if a source audio signal is present. If a source audio signal is present, method 132 may proceed to step 146. If no source audio signal is present, method 132 may proceed to step 136.

At step 136, PPD 32 may determine if ambient sound has content at higher frequencies (e.g., between 2 KHz and 5 kHz). If ambient sound has content at higher frequencies, method 132 may proceed to step 138. Otherwise, if ambient sound does not have content at higher frequencies, method 132 may proceed to step 140.

At step 138, PPD 32 may activate forward passive occlusion detection. After completion of step 138, method 132 may proceed to step 148.

At step 140, PPD 32 may determine whether adaptive noise cancellation is active in system 40. If adaptive noise cancellation is active, method 132 may proceed to step 142. If adaptive noise cancellation is inactive, method 132 may proceed to step 146.

At step 142, PPD 32 may determine if ambient sound has content at middle frequencies (e.g., between 300 Hz and 2 kHz). If ambient sound has content at middle frequencies, method 132 may proceed to step 144. Otherwise, if ambient sound does not have content at middle frequencies, method 132 may proceed to step 146.

At step 144, PPD 32 may activate active noise cancellation effect detection. After completion of step 144, method 132 may proceed to step 148.

At step 146, PPD 32 may activate pilot signal-based detection. After completion of step 146, method 132 may proceed to step 148.

At step 148, PPD 32 may activate reverse passive occlusion detection. After completion of step 148, method 132 may proceed to step 150.

At step 150, PPD 32 may combine the detector decisions of the activated proximity detection methods to render a pinna proximity detection decision. After completion of step 150, method 132 may end.

In addition to the approach described above for selecting and combining pinna proximity detection methods, other parameters may be used to select which pinna proximity detection methods to employ. For example, some detection methods may consume more battery power than others (e.g., when a pilot detector plays a strong pilot in a case where there is no source audio or anti-noise, such approach consumes a fair amount of power to drive pilot signal PILOT through speaker SPKR). In such case, if there is another detection approach well-suited to the ambient/listening scenario, PPD 32 may select it instead.

Figure 23:
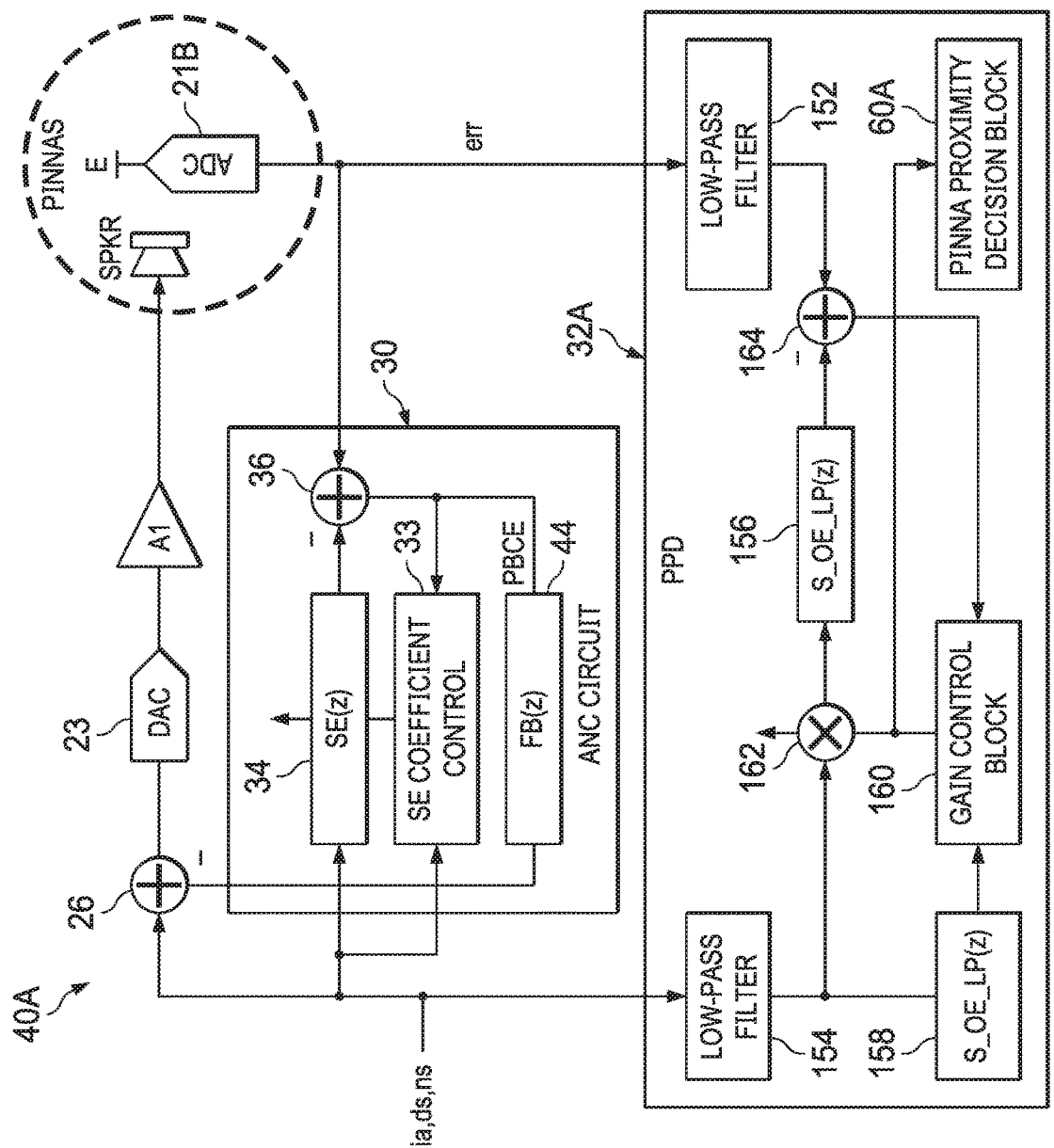
FIG. 23 is a block diagram of a system alternative to the systems of the foregoing FIGURES including selected signal processing circuits and functional blocks within an adaptive noise cancelling circuit and pinna proximity detection circuit of a coder-decoder integrated circuit of FIG. 2, in accordance with embodiments of the present disclosure.

FIG. 23 is a block diagram of a system 40A including selected components of CODEC IC 20, including ANC circuit 30 and PPD 32A, in accordance with embodiments of the present disclosure. System 40A of FIG. 23 is similar in many respects to system 40 of FIG. 3, and thus, only the key differences between systems 40A and 40 are described below. One key difference between system 40A and system 40 is that system 40A includes PPD 32A in lieu of PPD 32. Unlike PPD 32, PPD 32A may perform pinna proximity detection without use of a pilot signal. Instead, when source audio is present, the source audio signal may provide the training signal for an adaptive gain-based pinna proximity detector. As shown in FIG. 23, PPD 32A may include low-pass filters 152 and 154. Low-pass filters 152 and 154 may respectively low-pass filter error microphone signal err and the source audio signal in order to focus on analysis on the lower-frequency response of acoustic coupling between speaker SPKR and error microphone E. PPD 32A may also include two filters 156 and 158, each having a response S_OE_LP(z) that may represent an a priori low-frequency speaker SPKR to error microphone E coupling when a headphone is not near pinna of ear 5 (off ear). Filter 158 may be needed to maintain phase balance for both inputs to gain control block 160.

A gain control block 160 (which may use a least-mean-squares approach) may adaptively control a gain of a gain element 162 in an attempt to minimize a difference signal (as generated by combiner 164) between the low-pass filtered error microphone signal and the output of filter 156. When the output of combiner 164 is minimized, the combination of the adaptive gain of gain element 162 and filter 158 may adequately model a low-frequency coupling response between speaker SPKR and error microphone E. When speaker SPKR is off-ear, this gain may be near unity. When speaker SPKR is on ear, this gain may be much smaller than unity. Pinna proximity decision block 60A may use this gain to make a decision regarding proximity between speaker SPKR and pinna of ear 5.

Figure 24:
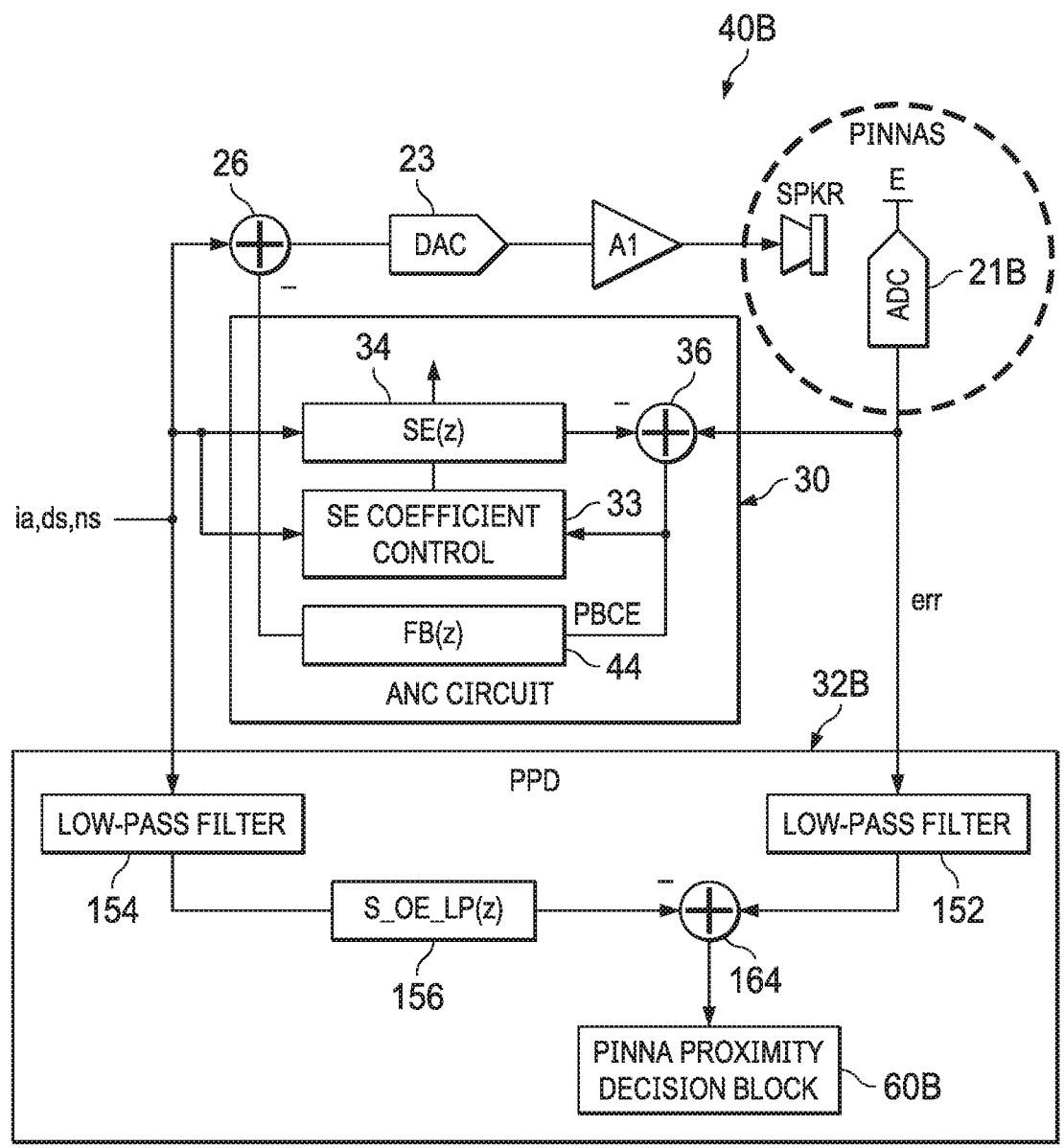
FIG. 24 is a block diagram of a system similar to that of FIG. 24 without adaptive gain control elements, in accordance with embodiments of the present disclosure.

When source audio is available, proximity detection may be performed by removing adaptive gain-based components from PPD 32A. FIG. 24 is a block diagram of a system 40B including selected components of CODEC IC 20, including ANC circuit 30 and PPD 32B, in accordance with embodiments of the present disclosure. System 40B of FIG. 24 is similar in many respects to system 40A of FIG. 23, and thus, only the key differences between systems 40B and 40A are described below. One key difference between system 40B and system 40A is that system 40B includes PPD 32B in lieu of PPD 32A. Unlike PPD 32A, PPD 32B may perform pinna proximity detection without use of adaptive gain control circuitry. When speaker SPKR is off ear, the difference (as generated by combiner 164) between the energy of the low-pass filtered error microphone signal and the output of filter 156 may be small, and when speaker SPKR is on ear, such difference may be significantly larger. Accordingly, pinna proximity decision block 60B may utilize this difference to render a pinna proximity decision.

Figure 25:
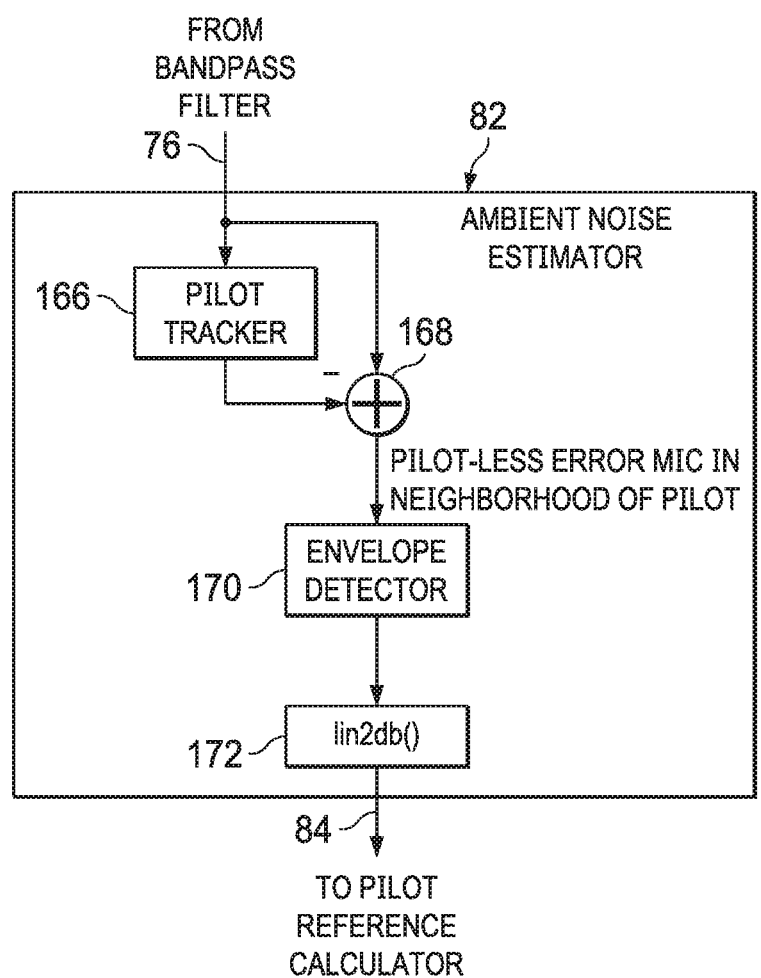
FIG. 25 is a block diagram of an example ambient noise estimator, in accordance with embodiments of the present disclosure.

Turning back to FIG. 13, system 40 is shown there using an ambient noise estimator 82. FIG. 25 is a block diagram of an example ambient noise estimator 82, in accordance with embodiments of the present disclosure. To effectively estimate ambient noise, it may be necessary to remove the sensed pilot signal PILOT', as much as possible, from the bandpass-filtered error microphone signal. Such removal may be performed by pilot tracker 56 depicted in FIG. 13, or by an additional pilot tracker 166, as shown in FIG. 25, in order to predict sensed pilot signal PILOT'. Combiner 168 may subtract this predicted pilot signal from the bandpass-filtered error microphone signal, resulting in a pilot-less bandpass-filtered error microphone signal. An envelope detector 170 and linear-to-decibel converter 172 may further process the pilot-less bandpass-filtered error microphone signal to generate an estimate of ambient noise, which ambient noise estimator 82 may communicate to pilot reference calculator 84.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An integrated circuit, comprising:
    an output for providing an output signal to a transducer, wherein the output signal includes a pilot signal;
    a microphone input for receiving a microphone signal from a microphone indicative of an output of the transducer; and
    a processing circuit comprising:
        a pilot signal control configured to apply an adjustment to the pilot signal as necessary to maintain the pilot signal at a substantially constant magnitude regardless of proximity of the transducer to a pinna; and
        a proximity determination block configured to determine proximity of the transducer to the pinna based on the adjustment.

2. The integrated circuit of claim 1, wherein the proximity determination block is further configured to determine proximity of the transducer to the pinna by comparing the adjustment to a threshold.

3. The integrated circuit of claim 1, wherein the processing circuit further comprises an adaptive noise control system configured to generate an anti-noise signal as a component of the output signal.

4. The integrated circuit of claim 3, wherein the processing circuit further comprises an adaptive transducer-to-pinna model configured to prevent a source audio signal to be reproduced at the transducer from being cancelled by the anti-noise signal.

5. The integrated circuit of claim 4, wherein the processing circuit further comprises a band-rejection filter configured to filter out the pilot signal to prevent the pilot signal from being received by the adaptive noise control system.

6. The integrated circuit of claim 5, wherein the processing circuit further comprises a second band-rejection filter configured to filter out the pilot signal to prevent the pilot signal from being received by the adaptive transducer-to-pinna model.

7. The integrated circuit of claim 3, wherein the processing circuit further comprises an anti-noise gain configured to modify a magnitude of the anti-noise signal.

8. The integrated circuit of claim 7, wherein the proximity determination block further configured to:
    determine proximity of the transducer to the pinna by comparing the adjustment to a threshold; and
    the threshold is varied based on the anti-noise gain.

9. The integrated circuit of claim 1, wherein the pilot signal control is implemented as a proportional-integral-derivative-based automatic gain control.

10. The integrated circuit of claim 9, wherein an integrator term of the proportional-integral-derivative-based automatic gain control is clamped to minimize negative values of the adjustment.

11. The integrated circuit of claim 1, wherein:
the processing circuit further comprises a pilot signal tracker that tracks the pilot signal; and
the pilot signal control is tuned to have a bandwidth slower than that of the pilot signal tracker.

12. The integrated circuit of claim 11, wherein the pilot signal control is tuned to have a bandwidth approximately ten times slower than that of the pilot signal tracker.

13. The integrated circuit of claim 1, wherein the processing circuit further comprises a high-pass filter configured to filter the microphone signal in order to prevent low-frequency and direct-current components of the microphone signal from influencing operation of the pilot signal control.

14. The integrated circuit of claim 1, wherein the processing circuit further comprises a bandpass pass filter configured to bandpass filter the microphone signal within a range of frequencies occupied by the pilot signal.

15. The integrated circuit of claim 1, wherein the pilot signal control is configured to minimize negative values of the adjustment.

16. The integrated circuit of claim 1, wherein:
the processing circuit further comprises an ambient noise estimator coupled to the microphone and configured to generate an estimate of ambient noise in a region of frequencies near a frequency of the pilot signal; and
the pilot signal control is further configured to apply the adjustment based on the estimate of ambient noise.

17. The integrated circuit of claim 16, wherein the ambient noise estimate is configured to generate the estimate of ambient noise by subtracting a prediction of the pilot signal from the microphone signal in order to minimize the pilot signal.

18. The integrated circuit of claim 1, wherein the pilot signal is duty-cycled such that the pilot signal cycles between being active and being inactive.

19. The integrated circuit of claim 18, wherein the pilot signal is ramped in an increasing manner when being activated and ramped in a decreasing manner when being deactivated in order to avoid audio artifacts associated with activation and deactivation.

20. The integrated circuit of claim 19, wherein the proximity determination block is prevented from determining proximity of the transducer to the pinna when the pilot signal is deactivated or is being ramped.

21. The integrated circuit of claim 19, wherein the pilot signal control is prevented from adjusting the pilot signal when the pilot signal is deactivated or is being ramped.

22. A method comprising:
providing an output signal to a transducer, wherein the output signal includes a pilot signal;
receiving a microphone signal from a microphone indicative of an output of the transducer;
applying an adjustment to the pilot signal as necessary to maintain the pilot signal at a substantially constant magnitude regardless of proximity of the transducer to a pinna; and
determining proximity of the transducer to the pinna based on the adjustment.

23. The method of claim 22, further comprising determining proximity of the transducer to the pinna by comparing the adjustment to a threshold.

24. The method of claim 22, further comprising generating an anti-noise signal as a component of the output signal.

25. The method of claim 24, further comprising implementing an adaptive transducer-to-pinna model to prevent a source audio signal to be reproduced at the transducer from being cancelled by the anti-noise signal.

26. The method of claim 25, further comprising filtering with a band-rejection to filter out the pilot signal to prevent the pilot signal from being received by the adaptive noise control system.

27. The method of claim 26, further comprising filtering with a second band-rejection filter to filter out the pilot signal to prevent the pilot signal from being received by the adaptive transducer-to-pinna model.

28. The method of claim 24, further comprising modifying a magnitude of the anti-noise signal with an anti-noise gain.

29. The method of claim 28, further comprising determining proximity of the transducer to the pinna by comparing the adjustment to a threshold, wherein the threshold is varied based on the anti-noise gain.

30. The method of claim 22, wherein applying the adjustment to the pilot signal is performed using a proportional-integral-derivative-based automatic gain control.

31. The method of claim 30, wherein an integrator term of the proportional-integral-derivative-based automatic gain control is clamped to minimize negative values of the adjustment.

32. The method of claim 22, further comprising implementing a pilot signal tracker that tracks the pilot signal, wherein a pilot signal control for applying the adjustment to the pilot signal is tuned to have a bandwidth slower than that of the pilot tracker.

33. The method of claim 32, wherein the pilot signal control is tuned to have a bandwidth approximately ten times slower than that of the pilot tracker.

34. The method of claim 22, further comprising filtering, with a high-pass filter, the microphone signal in order to prevent low-frequency and direct-current components of the microphone signal from influencing operation of the pilot signal control.

35. The method of claim 22, further comprising bandpass filtering, with a bandpass pass filter, the microphone signal within a range of frequencies occupied by the pilot signal.

36. The method of claim 22, wherein applying the adjustment to the pilot signal comprises minimizing negative values of the adjustment.

37. The method of claim 22, further comprising:
generating an estimate of ambient noise in a region of frequencies near a frequency of the pilot signal; and
applying the adjustment based on the estimate of ambient noise.

38. The method of claim 37, further comprising generating the estimate of ambient noise by subtracting a prediction of the pilot signal from the microphone signal in order to minimize the pilot signal.

39. The method of claim 22, further comprising duty-cycling the pilot signal such that the pilot signal cycles between being active and being inactive.

40. The method of claim 39, further comprising ramping the pilot signal in an increasing manner when being activated and ramping the pilot signal in a decreasing manner when being deactivated in order to avoid audio artifacts associated with activation and deactivation.

41. The method of claim 40, further comprising preventing the determination of the proximity of the transducer to the pinna when the pilot signal is deactivated or is being ramped.

42. The method of claim 40, further comprising preventing the adjustment of the pilot signal when the pilot signal is deactivated or is being ramped.

* * * * *